(12) United States Patent
Huang et al.

(10) Patent No.: US 11,815,901 B2
(45) Date of Patent: Nov. 14, 2023

(54) SELF-DRIVING DEVICE SYSTEM AND CHARGING STATION

(71) Applicant: Nanjing Chervon Industry Co., Ltd., Nanjing (CN)

(72) Inventors: Cunrong Huang, Nanjing (CN); Qing Gao, Nanjing (CN); Hongwei Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/311,079

(22) Filed: May 2, 2023

(65) Prior Publication Data

US 2023/0266769 A1 Aug. 24, 2023

Related U.S. Application Data

(63) Continuation of application No. PCT/CN2021/132087, filed on Nov. 22, 2021.

(30) Foreign Application Priority Data

| Dec. 14, 2020 | (CN) | .......................... 202011468089.6 |
| Dec. 30, 2020 | (CN) | .......................... 202011613380.8 |

(Continued)

(51) Int. Cl.
*G05D 1/02* (2020.01)

(52) U.S. Cl.
CPC ......... *G05D 1/0225* (2013.01); *G05D 1/0265* (2013.01); *G05D 2201/0208* (2013.01)

(58) Field of Classification Search
CPC ............... G05D 1/0225; G05D 1/0226; G05D 2201/0208; H02J 7/00; H02J 50/00
See application file for complete search history.

(56) References Cited

U.S. PATENT DOCUMENTS

| 2020/0142425 A1 | 5/2020 | Strandberg |
| 2020/0183413 A1* | 6/2020 | Hook ................... G05D 1/0261 |

FOREIGN PATENT DOCUMENTS

| CN | 104737698 A | 7/2015 |
| CN | 107493797 A | 12/2017 |

(Continued)

OTHER PUBLICATIONS

ISA/CN, International Search Report issued on PCT application No. PCT/CN2021/132087, dated Feb. 10, 2022, 4 pages.

(Continued)

*Primary Examiner* — Said Bouziane
(74) *Attorney, Agent, or Firm* — Greenberg Traurig, LLP

(57) ABSTRACT

A charging station capable of guiding a self-driving device to interface includes a base plate installed in a working area to fix the self-driving device; a first wire surrounding on the base plate and connected to a signal generator independently of a boundary; a second wire surrounding on the base plate and connected to the signal generator independently of the boundary and the first wire; and the signal generator sending a guide signal to the first wire and/or the second wire; where multiple areas surrounded by the first wire and the second wire include at least a first area having a first magnetic field signal, a second area having a second magnetic field signal, and a third area having a third magnetic field signal.

21 Claims, 21 Drawing Sheets

(30) Foreign Application Priority Data

Dec. 30, 2020 (CN) .......................... 202011613566.3
Dec. 30, 2020 (CN) .......................... 202011613606.4
Dec. 30, 2020 (CN) .......................... 202011615556.3

(56) References Cited

FOREIGN PATENT DOCUMENTS

| CN | 109193823 A | 1/2019 |
|----|-------------|--------|
| CN | 109739242 A | 5/2019 |

OTHER PUBLICATIONS

ISA/CN, English translation of International Search Report issued on PCT application No. PCT/CN2021/132087, dated Feb. 10, 2022, 2 pages.
ISA/CN, Written Opinion issued on PCT application No. PCT/CN2021/132087, dated Feb. 10, 2022, 3 pages.
ISA/CN, English translation of Written Opinion issued on PCT application No. PCT/CN2021/132087, dated Feb. 10, 2022, 5 pages.

\* cited by examiner

| Coding | Amplitude | Phase |
|---|---|---|
| 000 | $A_1$ | 0 |
| 001 | $A_2$ | 0 |
| 010 | $A_1$ | $\pi/2$ |
| 011 | $A_2$ | $\pi/2$ |
| 100 | $A_1$ | $\pi$ |
| 101 | $A_2$ | $\pi$ |
| 110 | $A_1$ | $3\pi/2$ |
| 111 | $A_2$ | $3\pi/2$ |

FIG. 27

SELF-DRIVING DEVICE SYSTEM AND CHARGING STATION

RELATED APPLICATION INFORMATION

This application is a continuation of International Application Number PCT/CN2021/132087, filed on Nov. 22, 2021, through which this application also claims the benefit under 35 U.S.C. § 119(a) of Chinese Patent Application No. 202011613566.3, filed on Dec. 30, 2020, Chinese Patent Application No. 202011613380.8, filed on Dec. 30, 2020, Chinese Patent Application No. 202011613606.4, filed on Dec. 30, 2020, Chinese Patent Application No. 202011615556.3, filed on Dec. 30, 2020, and Chinese Patent Application No. 202011468089.6, filed on Dec. 14, 2020, which applications are incorporated herein by reference in their entirety.

BACKGROUND

Generally, an outdoor gardening cutting tool such as a mower is provided with an operation handle for pushing. The operation handle is provided with a switch box and a control mechanism near a grip, where the switch box and the control mechanism are convenient for an operator to operate and control. The mower travels on the ground and performs a cutting operation by relying on a thrust applied by the operator to the operation handle. The operator operates such a push mower with a very high labor intensity. With the continuous development of artificial intelligence, self-driving devices that can travel themselves have also been developed. The self-driving devices can automatically travel and perform preset relevant tasks without manual operation and intervention, greatly saving manpower and material resources and bringing convenience to the operator.

The self-driving devices bring great convenience to users and free the users from heavy gardening care work. Currently, a self-driving device system also includes a charging station and a boundary, where the charging station is disposed on the ground and connected to the boundary, and the boundary is connected to the charging station and surrounds a working area so that a self-propelled device automatically travels in the working area and performs an operation. However, when a self-driving device needs to be charged in a working process, the self-driving device needs to travel along the boundary to return to the charging station and be charged, causing a waste of time and affecting working efficiency. A smart mower can achieve fully automatic lawn trimming and maintenance through the application of sensing technology, positioning technology, boundary identification technology, complete area coverage path planning technology, autonomous recharge technology, and salesperson technology and does not need to be directly controlled and operated manually, thereby greatly reducing labor costs. The smart mower is a tool suitable for lawn trimming and maintenance in places such as home yards and public green space.

The working area of the smart mower is generally specified by a boundary. The smart mower works only in the working area defined by the boundary. However, since the boundaries of multiple smart mowers are adjacent to each other, the smart mower may receive multiple magnetic field signals including a first magnetic field signal of the smart mower and external magnetic field signals of other smart mowers. Due to uncertain lengths and intervals for sending the magnetic field signals, a sensing unit of the smart mower cannot distinguish the first magnetic field signal of the smart mower. Thus, position information determined by the smart mower has an error. For example, if the smart mower within the boundary misidentifies an adjacent external magnetic field signal as the first magnetic field signal of the smart mower, false information that the smart mower is outside the boundary may be obtained. Therefore, a self-driving device system and a charging station are required urgently, so as to reduce the false determination of a magnetic field signal and obtain more accurate position information.

SUMMARY

A charging station capable of guiding a self-driving device to interface includes a base plate installed in a working area to fix the self-driving device; a first wire surrounding on the base plate and connected to a signal generator independently of a boundary; a second wire surrounding on the base plate and connected to the signal generator independently of the boundary and the first wire; and the signal generator sending a guide signal to the first wire and/or the second wire; where multiple areas surrounded by the first wire and the second wire include at least a first area having a first magnetic field signal, a second area having a second magnetic field signal, and a third area having a third magnetic field signal.

In one example, the multiple areas surrounded by the first wire and the second wire further include a fourth area having a fourth magnetic field signal.

In one example, the first magnetic field signal includes a first magnetic field in a first direction and a second magnetic field in the first direction; the second magnetic field signal includes the first magnetic field in the first direction and a second magnetic field in a second direction; and the third magnetic field signal includes a first magnetic field in the second direction and the second magnetic field in the first direction.

In one example, the fourth magnetic field signal includes a first magnetic field in a second direction and a second magnetic field in the second direction.

In one example, the signal generator includes: a first signal interface connected to the first wire and used for outputting a first guide signal; and a second signal interface connected to the second wire and used for outputting a second guide signal; where the first guide signal and the second guide signal are outputted alternately.

In one example, a second output interface is included for being connected to a charging interface of the self-driving device to charge the self-driving device.

The self-driving device includes: a traveling motor; multiple sensors for sensing magnetic field signals of the multiple areas surrounded by the first wire and the second wire; and a mower control module configured to control, according to a magnetic field signal sensed by the multiple sensors, the traveling motor to operate such that the charging interface of the self-driving device interfaces with the second output interface.

In one example, the self-driving device includes: traveling wheels including a left traveling wheel and a right traveling wheel; a first sensor disposed near the left traveling wheel; and a second sensor disposed near the right traveling wheel.

The mower control module is configured to, when the self-driving device moves along a route, control the traveling wheels to continue traveling along the route when determining that the first sensor is located in the first area and the second sensor is located in the first area.

In one example, a third sensor is disposed near a rear side of a body.

The mower control module is configured to, when the self-driving device moves along a route, determine that the self-driving device is at a preset position and send a stop signal to the traveling motor to stop the self-driving device from advancing when determining that the first sensor is located in the second area, the second sensor is located in the third area, and the third sensor is located in the first area.

In one example, the second output interface includes: a first power supply terminal connected to a first charging terminal of the charging interface; and a second power supply terminal connected to a second charging terminal of the charging interface.

A voltage detection unit is configured to detect a voltage value of the first power supply terminal.

When the voltage value of the first power supply terminal is a preset voltage value and the multiple sensors are at the preset position, a controller makes the second output interface output electrical energy to charge the self-driving device.

In one example, the self-driving device is a smart mower.

A charging station capable of guiding a self-driving device to interface includes a base plate installed in a working area to fix the self-driving device; a first wire surrounding a first wire area on the base plate; and a second wire surrounding a second wire area on the base plate; where the first wire area and the second wire area partially overlap; and the charging station is configured to provide guide signals to the first wire and the second wire to guide the self-driving device to a preset position of the base plate so that the self-driving device interfaces with the charging station.

In one example, an overlapping area between the first wire area and the second wire area is defined as a first area; the first wire area includes the first area and a second area; and the second wire area includes the first area and a third area; where the second area is parallel to the third area.

In one example, the first wire area and the second wire area are symmetrical about the center line of the base plate.

In one example, the first area has a greater width than the second area.

The first area has a greater width than the third area.

In one example, the charging station includes: a first output interface for outputting a boundary signal to a boundary; a first signal interface independent of the first output interface, connected to the first wire, and used for outputting a first guide signal, where the first guide signal flows through the first wire to generate a first magnetic field; and a second signal interface independent of the first output interface, connected to the second wire, and used for outputting a second guide signal, where the second guide signal flows through the second wire to generate a second magnetic field; where the first guide signal and the second guide signal are outputted alternately.

In one example, a second output interface is used for being connected to a charging interface of the self-driving device to charge the self-driving device. The self-driving device includes: a traveling motor; multiple sensors for sensing directions of magnetic fields of multiple areas surrounded by the first wire and the second wire; and a mower control module configured to control, according to directions of magnetic fields sensed by the multiple sensors, the traveling motor to operate such that the charging interface of the self-driving device interfaces with the second output interface.

In one example, the self-driving device includes: traveling wheels including a left traveling wheel and a right traveling wheel; a first sensor disposed near the left traveling wheel; and a second sensor disposed near the right traveling wheel.

The mower control module is configured to, when the self-driving device moves along a route, control the traveling wheels to continue traveling along the route when determining that the first sensor is located in a first area and the second sensor is located in the first area.

In one example, a third sensor is disposed near a rear side of a body.

The mower control module is configured to, when the self-driving device moves along a route, determine that the self-driving device is at a preset position and send a stop signal to the traveling motor to stop the self-driving device from advancing when determining that the first sensor is located in a second area, the second sensor is located in a third area, and the third sensor is located in the first area.

In one example, the second output interface includes: a first power supply terminal connected to a first charging terminal of the charging interface; and a second power supply terminal connected to a second charging terminal of the charging interface.

A voltage detection unit is configured to detect a voltage value of the first power supply terminal.

When the voltage value of the first power supply terminal is a preset voltage value and the self-driving device is at the preset position, a controller makes the second output interface output electrical energy to charge the self-driving device.

In one example, the self-driving device is a smart mower.

A self-driving device system includes: a self-driving device capable of automatically traveling in a working area to operate; and a charging station capable of guiding the self-driving device to interface to charge the self-driving device. The charging station includes: a base plate installed in the working area to fix the self-driving device; a first wire surrounding on the base plate and connected to a signal generator independently of a boundary; a second wire surrounding on the base plate and connected to the signal generator independently of the boundary and the first wire; and the signal generator sending a signal to the first wire and/or the second wire; where multiple areas surrounded by the first wire and the second wire include at least a first area having a first magnetic field signal, a second area having a second magnetic field signal, and a third area having a third magnetic field signal.

The present application provides a charging station for guiding a self-driving device to interface and a self-driving device system, which can improve the reliability of interfacing for charging and the efficiency with which the self-driving device returns to the charging station to be charged.

A combination of a self-driving device system and a charging station include a boundary for planning a working area of a self-driving device; the self-driving device automatically traveling in the working area to operate; and the charging station electrically connected to the boundary and used for generating a coded boundary signal and sending the coded boundary signal to the boundary. The coded boundary signal flows through the boundary to generate a first magnetic field signal. The charging station includes a signal transmitter for generating the coded boundary signal by coding in a preset digital modulation and coding manner. The self-driving device receives an external magnetic field signal, acquires a decoded boundary signal in a preset decoding manner, and when the decoded boundary signal matches the coded boundary signal, determines that the external magnetic field signal received by the self-driving device is the first magnetic field signal generated when the coded boundary signal flows through the boundary.

A combination of a self-driving device system and a charging station include a boundary for planning a working area of a self-driving device; the self-driving device automatically traveling in the working area to operate; and the charging station electrically connected to the boundary and used for generating a coded boundary signal and sending the coded boundary signal to the boundary. The coded boundary signal flows through the boundary to generate a first magnetic field signal. The charging station includes a signal transmitter for generating the coded boundary signal by coding in a preset quadrature amplitude modulation coding manner. The self-driving device receives an external magnetic field signal, acquires a decoded boundary signal in a preset decoding manner, and when the decoded boundary signal matches the coded boundary signal, determines that the external magnetic field signal received by the self-driving device is the first magnetic field signal generated when the coded boundary signal flows through the boundary.

A self-driving device system includes: a boundary for planning a working area of a self-driving device; the self-driving device automatically traveling in the working area to operate; and a charging station electrically connected to the boundary and used for generating a coded boundary signal and sending the coded boundary signal to the boundary. The coded boundary signal flows through the boundary to generate a magnetic field signal. The charging station includes a signal transmitter for generating the coded boundary signal by coding based on a preset coding protocol. The self-driving device receives an external magnetic field signal, acquires a decoded boundary signal in a preset decoding manner, and when the decoded boundary signal matches the coded boundary signal, determines that the external magnetic field signal received by the self-driving device is a first magnetic field signal generated when the coded boundary signal flows through the boundary.

A combination of a self-driving device system and a charging station include a boundary for planning a working area of a self-driving device; the self-driving device automatically traveling in the working area to operate; and the charging station electrically connected to the boundary and used for generating a coded boundary signal and sending the coded boundary signal to the boundary. The coded boundary signal flows through the boundary to generate a first magnetic field signal. The charging station includes a signal transmitter for generating the coded boundary signal by coding in a preset relative phase-shift keying manner. The self-driving device receives an external magnetic field signal, acquires a decoded boundary signal in a preset decoding manner, and when the decoded boundary signal matches the coded boundary signal, determines that the external magnetic field signal received by the self-driving device is the first magnetic field signal generated when the coded boundary signal flows through the boundary. The preceding technical solutions reduce the case where another external magnetic field signal is misidentified as the first magnetic field signal, reducing the false determination of a magnetic field signal and obtaining more accurate position information.

BRIEF DESCRIPTION OF DRAWINGS

FIG. 27 is a schematic diagram of quadrature amplitude modulation coding as another example.

DETAILED DESCRIPTION

The present application is described below in detail in conjunction with drawings and examples.

Figure 1:
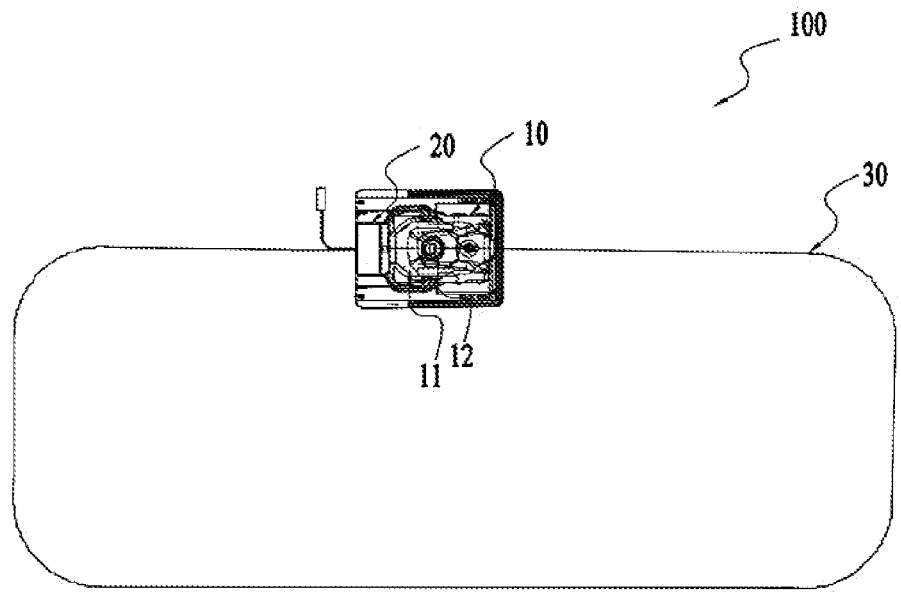
FIG. 1 is a structural view of a self-driving device system according to an example.

A smart mower system is an example of a self-driving device system according to an example shown in FIG. 1. A smart mower system 100 includes a smart mower 10, a charging station 20, and a boundary 30. Although the smart mower is involved in this example, it is to be understood that the present application is not limited to the examples disclosed herein and is applicable to other types of self-driving device capable of automatically traveling in a working area to operate, including, but not limited to, the smart mower, a snow thrower, and the like.

The smart mower 10 includes a housing 11, at least one wheel, a drive module, a battery set 12, and a power supply circuit. The housing 11 extends longitudinally. The at least one wheel is disposed at the bottom of the housing 11 and capable of rotating. The drive module is connected to the wheel and provides a driving force to drive the wheel, where the wheel includes a front wheel and a rear wheel. Optionally, the front wheel is a universal wheel, the rear wheel is a driving wheel, the number of rear wheels is two, and the number of front wheels may be two or may be set to one or zero. The battery set 12 supplies the smart mower 10 with electrical energy. The power supply circuit is electrically connected to the battery set and the drive module so that the electrical energy outputted from the battery set is supplied to the drive module to drive the at least one wheel to travel.

The smart mower 10 also includes a cutting blade for cutting grass or vegetation. Optionally, the drive module includes a traveling motor and a cutting motor. The traveling motor is used for supplying torque to the wheel to drive the smart mower 10 to travel. The cutting motor is used for supplying torque to the cutting blade to drive the cutting blade to rotate for a mowing operation. It is to be understood that the drive module may include only one motor that simultaneously drives the wheel and the cutting blade.

Figure 2:
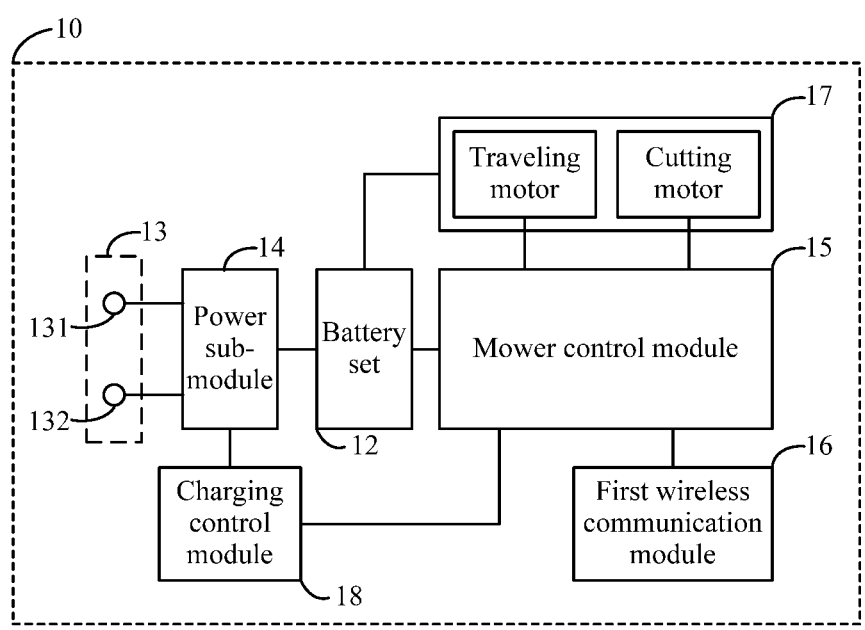
FIG. 2 is a circuit block diagram of a smart mower as one example.

FIG. 2 shows a circuit block diagram of the smart mower 10 as one example. As shown in FIG. 2, the smart mower 10 includes a charging interface 13, a power sub-module 14, the battery set 12, a mower control module 15, a first wireless communication module 16, and the drive module 17.

The charging interface 13 is used for being connected to the charging station 20 to access electrical energy to charge the smart mower 10. A first charging terminal 131 and a second charging terminal 132 are disposed in the charging interface 13.

The power sub-module 14 is configured to convert the electrical energy from the charging interface 13 into a power supply voltage and a power supply current adapted to the battery set 12 and output the power supply voltage and the power supply current. The power sub-module 14 is connected to the charging interface 13. In some examples, to supply power to the battery set 12, the power sub-module 14 reduces the voltage of the electrical energy from the charging interface 13 to 18 V. In some examples, the power sub-module 14 includes a direct current-direct current (DC-DC) conversion circuit.

The battery set 12 is used for supplying the smart mower 10 with electrical energy. For example, the battery set 12 is used for supplying power to at least the drive module 17, and the battery set 12 may also supply power to other electronic components or assemblies on the smart mower 10, such as the mower control module 15 and the first wireless communication module 16. In some examples, the battery set 12 includes one or more pluggable battery packs for providing an energy source for the smart mower 10, and at least one battery pack is also configured to provide an energy source for another power tool. The battery pack includes multiple cell units connected in series, connected in parallel, or connected in series and in parallel. Each cell unit has a voltage of 4.2 V.

The mower control module 15 is used for controlling at least the cutting motor and/or the traveling motor. In some examples, the smart mower 10 further includes a charging control module 18 configured to adjust an input voltage of the power sub-module 14 and an output voltage of the power sub-module 14 so that the output voltage is adapted to the battery set 12. The charging control module 18 is also configured to adjust an input current of the power sub-module 14 and an output current of the power sub-module 14 so that the output current is adapted to the battery set 12. In some examples, the mower control module 15 includes a control chip, such as a microcontroller unit (MCU) or an advanced RISC machine (ARM).

The first wireless communication module 16 is configured to communicate with the charging station 20 to transmit data, information, and instructions from the mower control module 15. In some examples, the first wireless communication module 16 includes a WIFI communication module. In other examples, the first wireless communication module 16 includes a Bluetooth communication module or a ZigBee communication module as long as the first wireless communication module 16 can establish a wireless connection with the charging station 20 and transmit data, information, and instructions.

The boundary 30 surrounds a working area of the smart mower 10 and is used for planning the working area of the smart mower 10. The area within the boundary 30 is the working area, and the area outside the boundary 30 is a non-working area.

The charging station 20 is fixed on a plane and electrically connected to the boundary 30. The charging station 20 generates a boundary signal and sends the boundary signal to the boundary 30, the boundary signal flows through the boundary 30 to generate a magnetic field, and the smart mower 10 senses the magnetic field and travels in the working area to perform the mowing operation. It is to be understood that the boundary signal is a current signal. The charging station 20 is also used for allowing the smart mower 10 lacking in energy to return to be replenished with energy.

Figure 3:
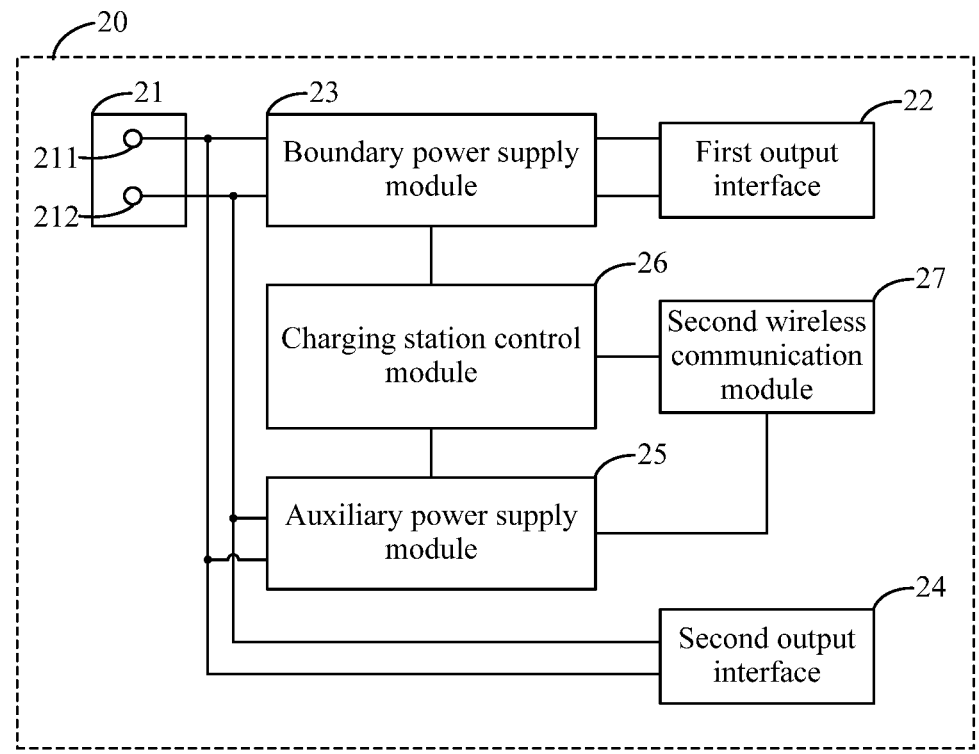
FIG. 3 is a circuit block diagram of a charging station as one example.

FIG. 3 shows a circuit block diagram of the charging station 20 as one example. As shown in FIG. 3, the charging station 20 includes an input interface 21, a first output interface 22, a boundary power supply module 23, a second output interface 24, an auxiliary power supply module 25, a charging station control module 26, and a second wireless communication module 27. The first output interface 22 is electrically connected to the boundary 30 to output the boundary signal. The second output interface 24 is used for being connected to the charging interface 13 of the smart mower 10 to charge the smart mower 10.

The input interface 21 is used for accessing electrical energy. For example, the input interface 21 is electrically connected to a charger. The charger includes an alternating current (AC) input interface, an alternating current-direct current (AC-DC) conversion circuit, and a direct current (DC) output interface. Specifically, the AC input interface is used for accessing AC. In some examples, the AC input interface is connected to a power plug. The power plug is inserted into an AC socket to access AC mains. The AC accessed by the AC input interface has a value range of 110 V to 130 V or 210 V to 230 V. The AC-DC conversion circuit is electrically connected to the AC input interface to convert the AC into DC. The DC output interface is electrically connected to the AC-DC conversion circuit to output the DC. The input interface 21 is electrically connected to the DC output interface to access the DC to the charging station 20. Specifically, the input interface 21 includes a positive input terminal 211 and a negative input terminal 212, where the positive input terminal 211 is used for accessing a positive electrode of DC, and the negative input terminal 212 is used for accessing a negative electrode of the DC.

The auxiliary power supply module 25 is used for supplying power to at least the charging station control module 26 and/or the second wireless communication module 27, and the auxiliary power supply module 25 may also supply power to other electronic components or assemblies on the charging station 20. The auxiliary power supply module 25 is connected to the input interface 21 to convert the voltage accessed by the input interface 21 into a power supply voltage adapted to the charging station control module 26 and/or the second wireless communication module 27 and output the power supply voltage. For example, in some examples, the auxiliary power supply module 25 reduces the voltage from the input interface 21 to 15 V to supply power to the charging station control module 26 and reduces a power voltage to 3.2 V to supply power to the second wireless communication module 27.

The second wireless communication module 27 is configured to wirelessly communicate with the smart mower 10 to transmit data, information, and instructions. The second wireless communication module 27 is communicatively connected to the first wireless communication module. In some examples, the second wireless communication module 27 includes a WIFI communication module. In other examples, the second wireless communication module 27 includes a Bluetooth communication module or a ZigBee communication module as long as the second wireless communication module 27 can establish a wireless connection with the smart mower 10 and transmit data, information, and instructions.

Figure 4:
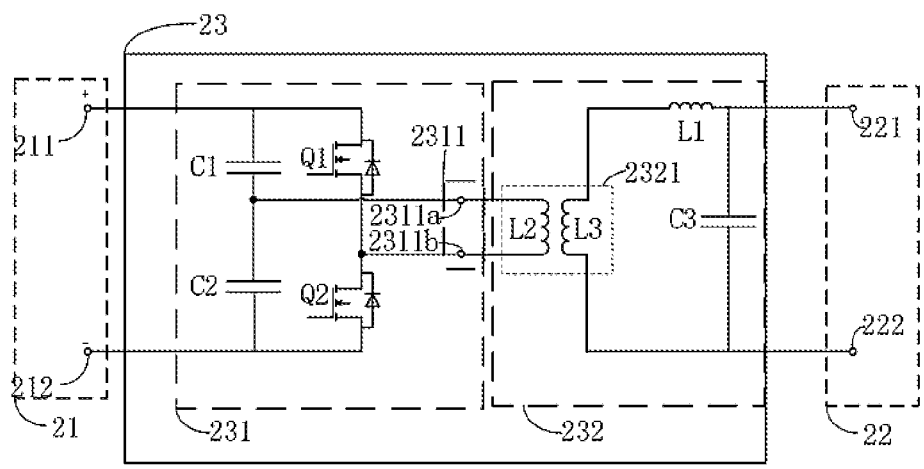
FIG. 4 is a specific circuit diagram of a boundary power supply module shown in FIG. 3.

The boundary power supply module 23 is connected in series between the input interface 21 and the first output interface 22 and configured to convert the DC accessed by the input interface 21 into the boundary signal and output the boundary signal. As shown in FIG. 4, the boundary power supply module 23 includes a first voltage conversion circuit 231 and an isolation circuit 232.

The first voltage conversion circuit 231 is electrically connected to the input interface 21 and configured to convert the electrical energy accessed by the input interface 21 into first AC. In some examples, the first voltage conversion circuit 231 is configured to convert the DC accessed by the input interface 21 into the first AC.

As an example, the first voltage conversion circuit 231 includes a first capacitor C1, a second capacitor C2, a first switch transistor Q1, a second switch transistor Q2, and a first voltage output port 2311.

The first voltage output port 2311 is used for outputting the first AC. Specifically, the first voltage output port 2311 includes a first output terminal 2311*a* and a second output terminal 2311*b*.

The first capacitor C1 and the second capacitor C2 are connected in series to the input interface 21. Specifically, one end of the first capacitor C1 is connected to the positive input terminal 211, the other end of the first capacitor C1 is connected to one end of the second capacitor C2 and also connected to the first output terminal 2311*a*, and the other end of the second capacitor C2 is connected to the negative input terminal 212. The first switch transistor Q1 and the second switch transistor Q2 are connected in series to the input interface 21, where a drain of the first switch transistor Q1 is connected to the positive input terminal 211, a source of the first switch transistor Q1 is connected to a drain of the second switch transistor Q2 and also connected to the second output terminal 2311*b*, and a source of the second switch transistor Q2 is connected to the negative input terminal 212.

In this manner, the first switch transistor Q1 and the second switch transistor Q2 convert the electrical energy inputted from the input interface 21 into the first AC by changing their respective on/off states. A gate of the first switch transistor Q1 and a gate of the second switch transistor Q2 are connected to the charging station control module 26 separately, and the first switch transistor Q1 and the second switch transistor Q2 change on or off states at a certain frequency according to a control signal outputted from the charging station control module 26, thereby converting the electrical energy inputted from the input interface 21 into the first AC. Specifically, when the first switch transistor Q1 is turned on, a current flows through the first switch transistor Q1, the second output terminal 2311*b*, the first output terminal 2311*a*, and the second capacitor C2 to form a loop; and when the second switch transistor Q2 is turned on, the current flows through the first capacitor C1, the first output terminal 2311*a*, the second output terminal 2311*b*, and the second switch transistor Q2 to form a loop. Therefore, the on/off states of the first switch transistor Q1 and the second switch transistor Q2 are changed so that the DC accessed by the input interface 21 is converted into the first AC outputted from the first voltage output port 2311.

The isolation circuit 232 is connected between the first voltage conversion circuit 231 and the first output interface 22 and configured to transmit the first AC in one way to the boundary 30 through the first output interface 22, where the first output interface 22 includes a first boundary terminal 221 and a second boundary terminal 222. Specifically, the isolation circuit 232 is connected to the first voltage output port 2311 and converts the first AC into the boundary signal and transmits the boundary signal in one way to the boundary 30 through the first output interface 22.

As an example, the isolation circuit 232 includes a transformer 2321, a third capacitor C3, and a first inductor L1.

The transformer includes a second inductor L2 and a third inductor L3, where the second inductor L2 is connected in series between the first output terminal 2311*a* and the second output terminal 2311*b*; and the third inductor L3 is coupled to the second inductor L2, the third inductor L3 is connected in series between the first boundary terminal 221 and the second boundary terminal 222, the first inductor L1 is connected in series between one end of the third inductor L3 and the first output interface 22, and the third capacitor is connected between the first boundary terminal 221 and the second boundary terminal 222.

When the current direction of the first AC of the first voltage conversion circuit 231 is from the first output terminal 2311*a* to the second output terminal 2311*b* through the second inductor L2, the third inductor L3 senses second AC and the second AC returns to the third inductor L3 through the first boundary terminal 221, the boundary 30, and the second boundary terminal 222. When the current direction of the first AC of the first voltage conversion circuit 231 is from the second output terminal 2311*b* to the first output terminal 2311*a* through the second inductor L2, the third inductor L3 senses the second AC and the second AC returns to the third inductor L3 through the second boundary terminal 222, the boundary 30, and the first boundary terminal 221. Therefore, the first output interface 22 is configured to generate a second AC signal according to the first AC, where the second AC signal is the boundary signal. The first inductor L1 and the third capacitor C3 collaborate to filter the second AC signal.

The isolation circuit 232 is disposed between the first voltage output port 2311 and the first output interface 22 to transmit the first AC from the first voltage output port 2311 to the boundary 30 in one way through the first output interface 22 so that an impact on the charging station and an external power supply when lightning strikes the boundary 30 can be prevented, thereby reducing damages of a lightning strike to a smart mowing system and improving the safety of the smart mowing system.

In some examples, the self-driving device system further includes a current detection module and a voltage detection module. The current detection module is configured to detect a charge current in a charging loop. The voltage detection module is configured to detect a first voltage across the charging interface. The control module is configured to acquire a first resistance value based on the charge current and the first voltage and reduce the charge current when the first resistance value is greater than or equal to a preset resistance value. The current detection module may be disposed in the charging station or the self-driving device.

Figure 5:
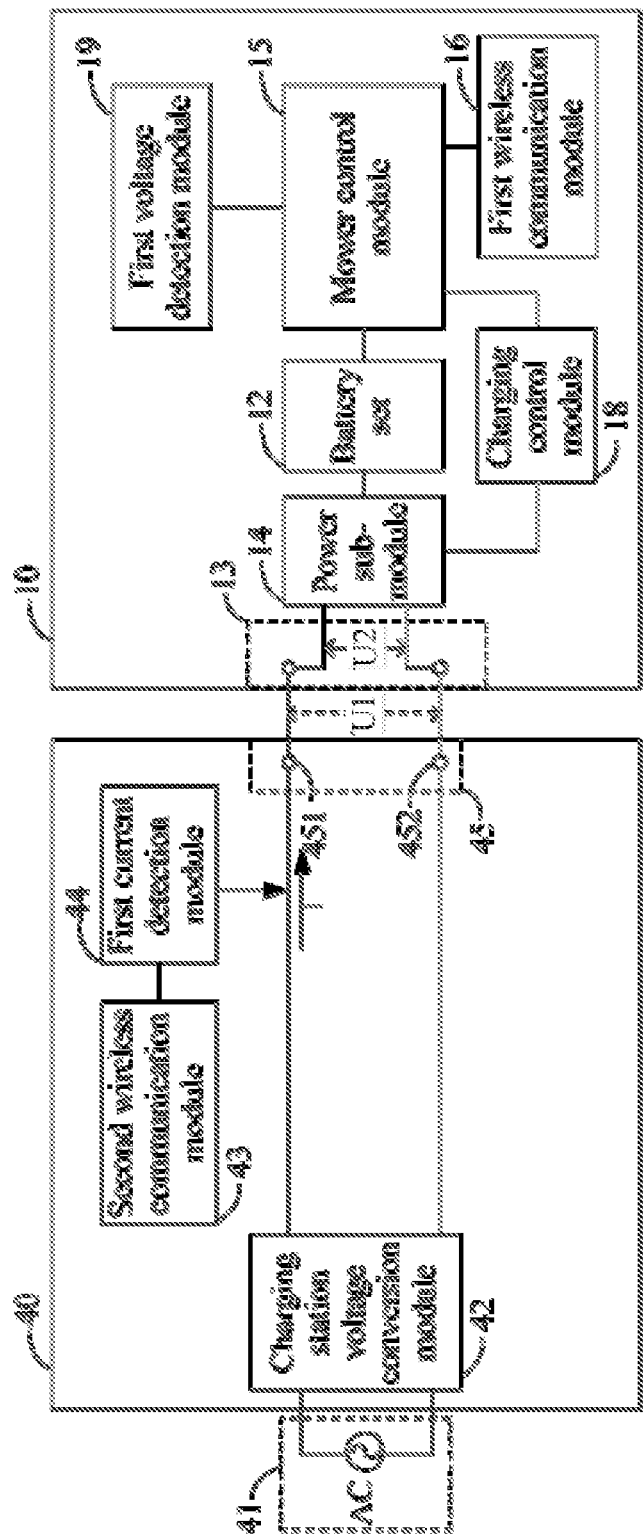
FIG. 5 is a partial circuit block diagram of a smart mowing system as one example.

FIG. 5 shows a partial circuit block diagram of a smart mowing system 100 as one example. As shown in FIG. 5, a charging station 40 includes a power module 41, a charging station voltage conversion module 42, a second wireless communication module 43, a first current detection module 44, and a second output interface 45. After the charging station 40 interfaces with the smart mower 10, the second output interface 45 is connected to the charging interface 13 of the smart mower 10 to form the charging loop for charging the smart mower 10. The second output interface 45 includes a first power supply terminal 451 and a second power supply terminal 452.

The power module 41 is configured to access AC to supply power to the charging station. In some examples, the power module 41 includes an AC plug and a peripheral circuit electrically connected to the AC plug. The AC plug is inserted into an AC socket to access AC mains, thereby providing an electrical energy source for the charging station. In some other examples, the power module 41 includes another structural form capable of accessing AC and a peripheral circuit thereof, for example, the AC plug accesses AC by accessing a mobile substation or the like. It is to be noted the specific structure and form of the power module 41 are not limited herein as long as the power module 41 can access AC. The AC accessible by the power module 41 has a value range of 110 V to 130 V or 210 V to 230 V.

The charging station voltage conversion module 42 is configured to convert the AC accessed by the power module 41 into DC and output the DC. In some examples, the charging station voltage conversion module 42 includes a rectifier circuit and a filter capacitor. The rectifier circuit is used for converting AC into DC and outputting the DC. In some examples, the rectifier circuit includes a rectifier bridge.

The first current detection module 44 is configured to detect a first charge current flowing through the charging loop. In some examples, the first current detection module 44 is a current sensor. In some other examples, the first current detection module 44 is a current detection circuit. The first current detection module 44 is also configured to send the detected first charge current to the smart mower through the second wireless communication module 43. In some other examples, the first current detection module 44 is disposed in the smart mower 10, connected to the mower control module 15, and configured to detect the first charge current flowing through the charging loop.

The smart mower 10 further includes a first voltage detection module 19 configured to detect the first voltage across the charging interface 13. Specifically, the first voltage detection module 19 is configured to detect a voltage between a first node and a second node in the charging loop, where in the charging loop, the first node is located between the first power supply terminal and the smart mower and the second node is located between the second power supply terminal and the smart mower, and the first voltage is denoted as a voltage U1 between two points on a first charging loop as shown in FIG. 5. Optionally, the first node is located between the first charging terminal and the power sub-module, the second node is located between the second charging terminal and the power sub-module, and the first voltage is a voltage U2 between two points on the first charging loop as shown in FIG. 5.

The mower control module 15 is configured to acquire the first resistance value based on the first charge current and the first voltage and reduce the first charge current in the first charging loop when the first resistance value is greater than or equal to the preset resistance value. Specifically, the mower control module is configured to perform the operations below.

A first current control signal is sent to the charging control module to control the power sub-module through the charging control module so that the first charge current is a first current value Ia.

The first charge current, that is, the first current value Ia, detected by the first current detection module 44 is acquired from the charging station and the first voltage is acquired from the first voltage detection module 19, where a voltage value of the first voltage is a first voltage value Ua.

A second current control signal is sent to the charging control module to adjust the first charge current to a second current value Ib through the charging control module.

The first charge current, that is, the second current value Ib, detected by the first current detection module 44 is acquired from the charging station and the first voltage is acquired from the first voltage detection module, where the voltage value of the first voltage is a second voltage value Ub.

The first resistance value Ra is calculated according to the first current value Ia, the second current value Ib, the first voltage value Ua, and the second voltage value Ub.

When the first resistance value Ra is greater than or equal to a first preset resistance value, a third current control signal is sent to the charging control module to reduce the first charge current in the first charging loop.

The preset resistance value ranges from $0.1\Omega$ to $0.5\Omega$.

It is to be understood that the preset resistance value may include a first value and a second value, where the first value is smaller than the second value. In some examples, if the first resistance value is greater than or equal to the first value and less than the second value, the charging station reduces the first charge current; if the first resistance value is greater than or equal to the second value, the charging station stops outputting electrical energy, that is, reduces the first charge current to 0.

Since the charging station 40 is generally disposed outdoors, the charging station 40 is very easily exposed to wind and rain, and the first power supply terminal 451 and the second power supply terminal 452 in the second output interface 45 of the charging station 40 are easily oxidized to increase resistance. In this manner, the smart mower 10 can monitor the oxidation degrees of the first power supply terminal and the second power supply terminal of the charging station and the oxidation degrees of the first charging terminal 131 and the second charging terminal 132 of the smart mower by calculating first resistance. When it is monitored that the terminals of the charging station 40 and/or the smart mower 10 are oxidized, the charging station 40 can reduce the first charge current in the first charging loop in time, thereby preventing a danger caused by heating after the second output interface 45 interfaces with the charging interface and improving the safety of charging the smart mower by the charging station.

It is to be understood that the first current detection module 44 may be disposed in the smart mower 10 as long as the first current detection module 44 can detect the first charge current flowing through the first charging loop.

Figure 6:
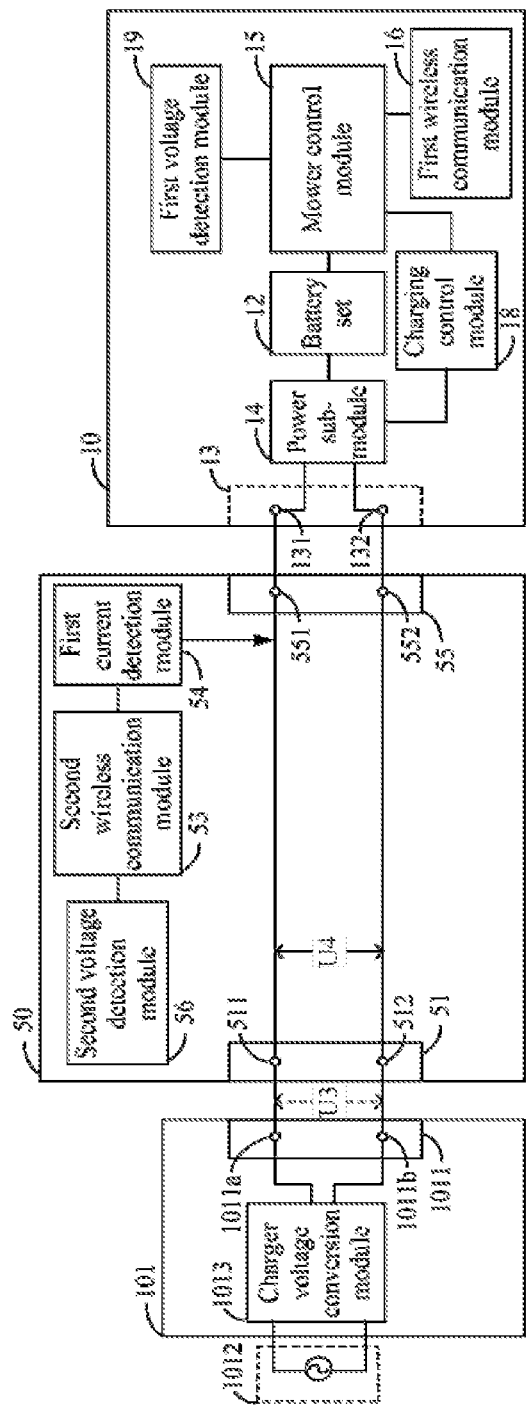
FIG. 6 is a partial circuit block diagram of a smart mowing system as another example.

FIG. 6 shows a circuit block diagram of a smart mowing system 100 as another example. As shown in FIG. 6, the smart mowing system 100 further includes a charger 101 for providing electrical energy for a charging station 50. After the charger 101 is connected to the charging station 50 and the charging station 50 interfaces with the smart mower 10, an adapter interface 1011 of the charger 101 is connected to an input interface 51 of the charging station 50 and a second output interface 55 of the charging station 50 is connected to the charging interface 13 of the smart mower 10 to form a charging loop for charging the smart mower 10.

The charger 101 includes a power module 1012, a charger voltage conversion module 1013, and the adapter interface 1011. The adapter interface is used for being electrically connected to the charging station to output electrical energy, and a positive adapter terminal 1011a and a negative adapter terminal 1011b are disposed in the adapter interface.

The power module 1012 is configured to access AC to supply power to the charging station 50. In some examples, the power module 1012 includes an AC plug and a peripheral circuit electrically connected to the AC plug. The AC plug is inserted into an AC socket to access AC mains, thereby providing an electrical energy source for the charging station. In some other examples, the power module includes another structural form capable of accessing AC and a peripheral circuit thereof, for example, the AC plug accesses AC by accessing a mobile substation or the like. It is to be noted the specific structure and form of the power module are not limited herein as long as the power module can access AC. The AC accessible by the power module has a value range of 110 V to 130 V or 210 V to 230 V.

The charger voltage conversion module 1013 is configured to convert the AC accessed by the power module 1012 into DC and output the DC. In some examples, the charger voltage conversion module 1013 includes a rectifier circuit and a filter capacitor. The rectifier circuit is used for converting AC into DC and outputting the DC. In some examples, the rectifier circuit includes a rectifier bridge. In some examples, the charger voltage conversion module 1013 further includes a DC-DC conversion circuit.

The example shown in FIG. 6 differs from the example shown in FIG. 5 in that the charging station further includes the input interface 51 and a second voltage detection module 56.

The input interface 51 is used for accessing the electrical energy provided by the charger 101. Specifically, the input interface 51 is electrically connected to the adapter interface 1011 of the charger 101. The input interface 51 includes a positive input terminal 511 and a negative input terminal 512, where the positive input terminal 511 is used for accessing a positive electrode of DC and is connected to the positive adapter terminal 1011a; and the negative input terminal 512 is used for accessing a negative electrode of the DC and is connected to the negative adapter terminal 1011b.

The second voltage detection module 56 is configured to detect a second voltage across the input interface 51. Specifically, the second voltage detection module 56 is configured to detect a voltage between a third node and a fourth node in the charging loop, where in the charging loop, the third node is located between the positive adapter terminal 1011a and the charging station and the fourth node is located between the negative adapter terminal 1011b and the charging station, and the second voltage is a voltage U3 between two points on the charging loop as shown in FIG. 6. Optionally, the third node is located between the positive input terminal 511 and a first power supply terminal 551, the fourth node is located between the negative input terminal 512 and a second power supply terminal 552, and the second voltage is a voltage U4 between two points on a second charging loop as shown in FIG. 6. The second voltage detection module 56 is also configured to send the second voltage to the smart mower 10 through a second wireless communication module 53.

A first current detection module 54 is configured to detect a second charge current flowing through the charging loop. In some examples, the first current detection module 54 is a current sensor. In some other examples, the first current detection module 54 is a current detection circuit. The first current detection module 54 is also configured to send the detected second charge current to the smart mower 10 through the second wireless communication module 53. In some other examples, the first current detection module 54 is disposed in the smart mower 10, connected to the mower control module 15, and configured to detect the second charge current flowing through the charging loop.

The second wireless communication module 53 is configured to be communicatively connected to the first wireless communication module 16 of the smart mower 10 to send the second voltage detected by the second voltage detection module 56 and the second charge current detected by the first current detection module 54 to the mower control module 15.

The mower control module 15 is configured to acquire a second resistance value based on the second charge current and the second voltage and reduce the second charge current in the second charging loop when the second resistance value is greater than or equal to a second preset resistance value. Specifically, the mower control module 15 is configured to perform the operations below.

A first current control signal is sent to the charging control module 18 to control the power sub-module through the charging control module 18 so that the second charge current is a first current value Ia.

The second charge current, that is, the first current value Ia, detected by the first current detection module 54 is acquired from the charging station, the first voltage is acquired from the first voltage detection module, where the voltage value of the first voltage is a first voltage value Ua, and the second voltage is acquired from the second voltage detection module 56, where a voltage value of the second voltage is a second voltage value Va.

A second current control signal is sent to the charging control module 18 to adjust the second charge current to a second current value Ib through the charging control module 18.

The second charge current, that is, the second current value Ia, detected by the first current detection module 54 is acquired from the charging station, the first voltage is acquired from the first voltage detection module, where the voltage value of the first voltage is a third voltage value Ub, and a second voltage is acquired from the second voltage detection module 56, where the voltage value of the second voltage is a fourth voltage value Vb.

The first resistance value is calculated according to the first current value Ia, the second current value Ib, the first voltage value Ua, and the third voltage value Ub.

When the first resistance value is greater than or equal to the second preset resistance value, a third current control signal is sent to the charging control module 18 to reduce the second charge current in the second charging loop.

The second preset resistance value ranges from 1Ω to 5Ω.

The second resistance value is calculated according to the first current value Ia, the second current value Ib, the second voltage value Va, and the fourth voltage value Vb.

When the second resistance value is greater than or equal to a third preset resistance value, the third current control signal is sent to the charging control module 18 to reduce the second charge current in the second charging loop.

In some examples, the mower control module 15 is also configured to perform the operations below.

A third resistance value is calculated according to the first resistance value and the second resistance value.

When the third resistance value is greater than or equal to a fourth preset resistance value, the third current control signal is sent to the charging control module 18 to reduce the second charge current in the second charging loop.

The fourth preset resistance value ranges from 0.1Ω to 0.5Ω.

Since the charging station 50 is generally disposed outdoors, the charging station 50 is very easily exposed to wind and rain, and the first power supply terminal 551 and the second power supply terminal 552 in the second output interface 55 of the charging station 50 and the positive input terminal 511 and the negative input terminal 512 in the input interface 51 of the charging station 50 are easily oxidized to increase resistance. In this manner, the smart mower 10 can monitor the oxidation degrees of the first power supply terminal 551 and the second power supply terminal 552 of the charging station, the oxidation degrees of the first charging terminal 131 and the second charging terminal 132 of the smart mower 10, the oxidation degrees of the positive adapter terminal 1011*a* and the negative adapter terminal 1011*b* of the charger, and the oxidation degrees of the positive input terminal 511 and the negative input terminal 512 of the charging station by calculating first resistance, second resistance, and third resistance. When it is monitored that the terminals of one of the charger 101, the charging station 50, and the smart mower 10 are oxidized, the charging station 50 can reduce the second charge current in the second charging loop in time, thereby preventing a danger caused by heating after the second output interface 55 interfaces with the charging interface 13 and improving the safety of charging the smart mower 10 by the charging station.

Figure 7:
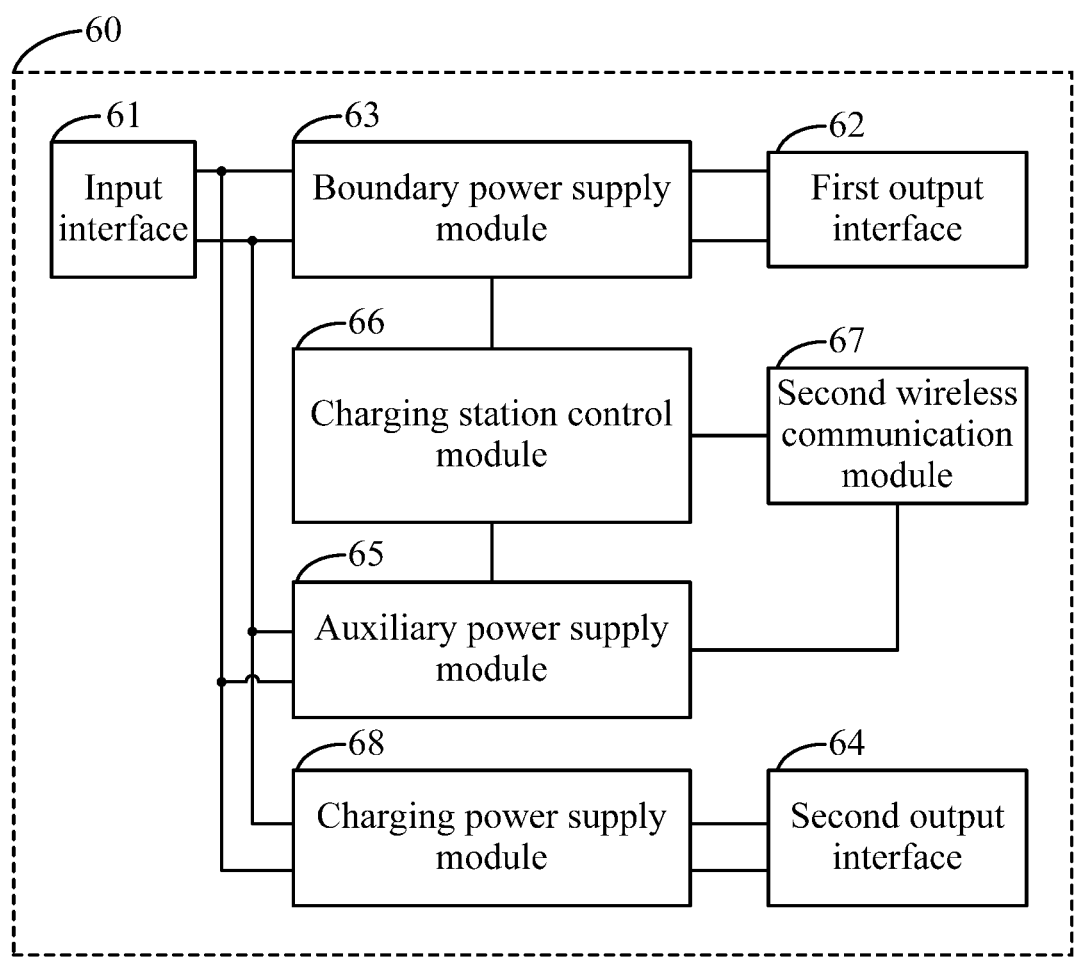
FIG. 7 is a circuit block diagram of a charging station as another example.

FIG. 7 shows a circuit block diagram of a charging station 60 as another example. As shown in FIG. 7, the charging station in the example shown in FIG. 7 differs from the charging station 20 in the example shown in FIG. 3 in that the charging station 60 further includes a charging power supply module 68 disposed between an input interface 61 and a second output interface 64 and configured to convert the electrical energy accessed by the input interface 61 into third AC. The third AC has a voltage range of 20 V to 60 V.

In some examples, the input interface 61 accesses DC. For example, the input interface 61 is electrically connected to a charger for converting AC mains into the DC and outputting the DC to the input interface 61. The charger includes an AC input interface, an AC-DC conversion circuit, and a DC output interface. Specifically, the AC input interface is used for accessing AC. In some examples, the AC input interface is connected to a power plug. The power plug is inserted into an AC socket to access the AC mains. The AC accessed by the AC input interface has a value range of 110 V to 130 V or 210 V to 230 V. The AC-DC conversion circuit is electrically connected to the AC input interface to convert the AC into the DC. The DC output interface is electrically connected to the AC-DC conversion circuit to output the DC. The input interface 61 is electrically connected to the DC output interface to access the DC to the charging station. In some other examples, the input interface 61 accesses AC. The input interface 61 is constructed as an AC plug and a peripheral circuit electrically connected to the AC plug. The AC plug is inserted into the AC socket to access AC mains, thereby providing an electrical energy source for the charging station. The input interface 61 may be constructed as another structural form capable of accessing AC and a peripheral circuit thereof, for example, the AC plug accesses AC by accessing a mobile substation or the like.

Figure 8:
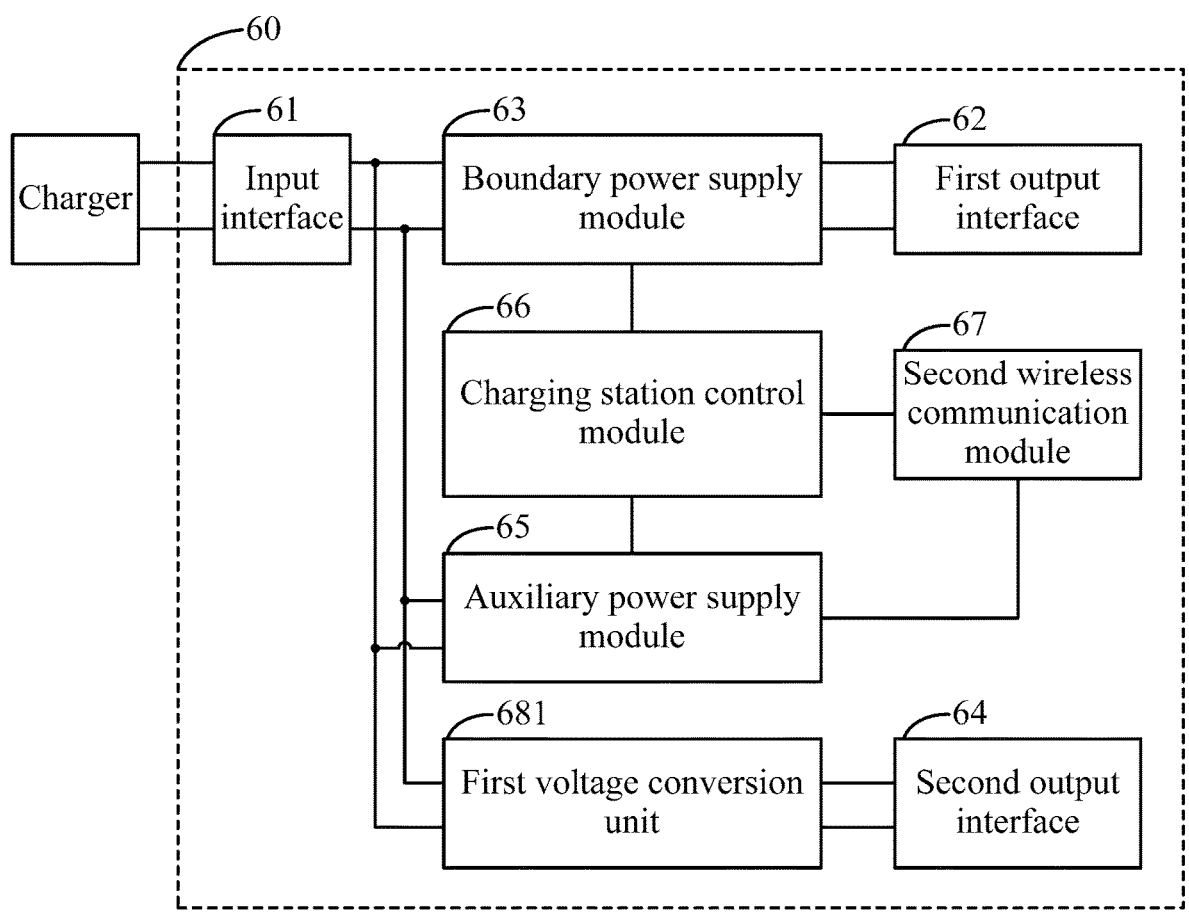
FIG. 8 is a circuit block diagram of a charging station as another example.

FIG. 8 shows a circuit block diagram of a charging station as another example. As shown in FIG. 8, the charging power supply module 68 includes a first voltage conversion unit 681 configured to convert the DC accessed by the input interface 61 into third AC.

Figure 9:
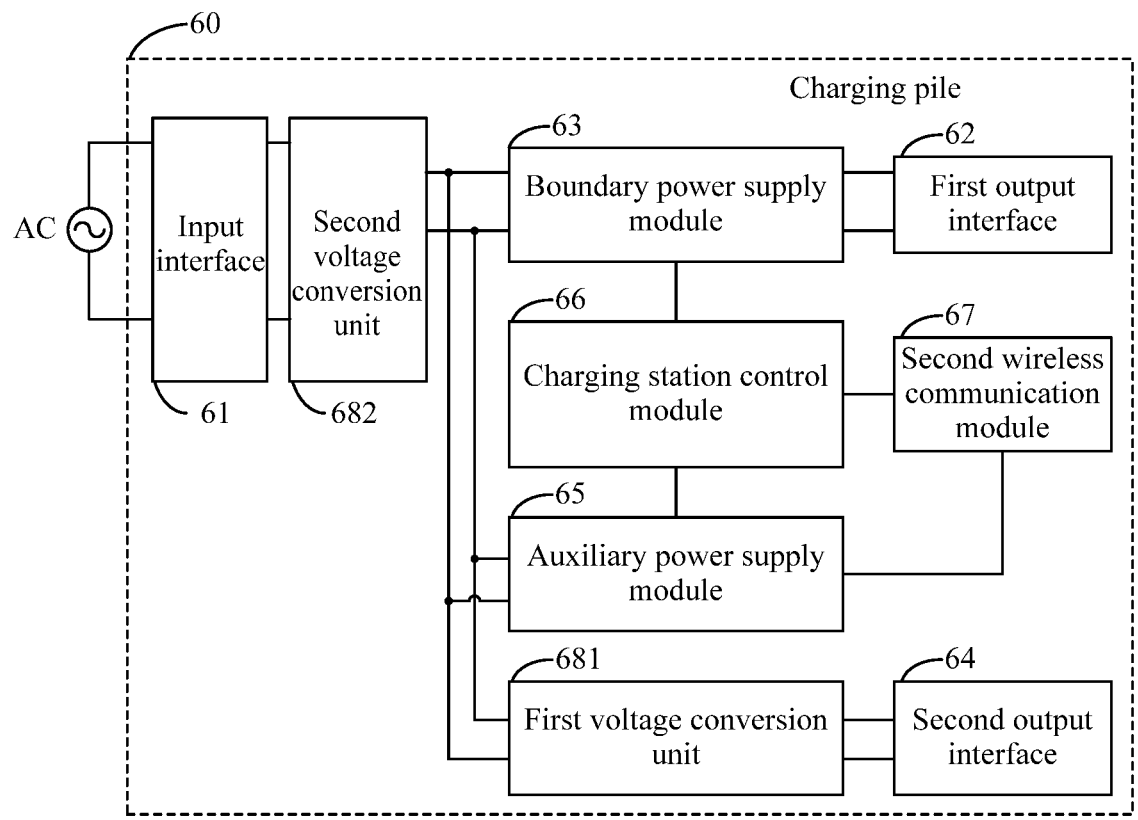
FIG. 9 is a circuit block diagram of a charging station as another example.

FIG. 9 shows a circuit block diagram of the charging station 60 as another example. As shown in FIG. 9, the charging station further includes a second voltage conversion unit. The second voltage conversion unit 682 is configured to convert fourth AC having a fourth voltage value and accessed by the input interface 61 into DC and output the DC, where a third voltage value is smaller than the fourth voltage value. In some examples, the second voltage conversion unit 682 includes a rectifier circuit and a filter capacitor. The rectifier circuit is used for converting the fourth AC into the DC and outputting the DC. In some examples, the rectifier circuit includes a rectifier bridge. The first voltage conversion unit 681 is connected to the second output interface 64 and configured to convert the DC outputted from the second voltage conversion unit 682 into the third AC.

Figure 10:
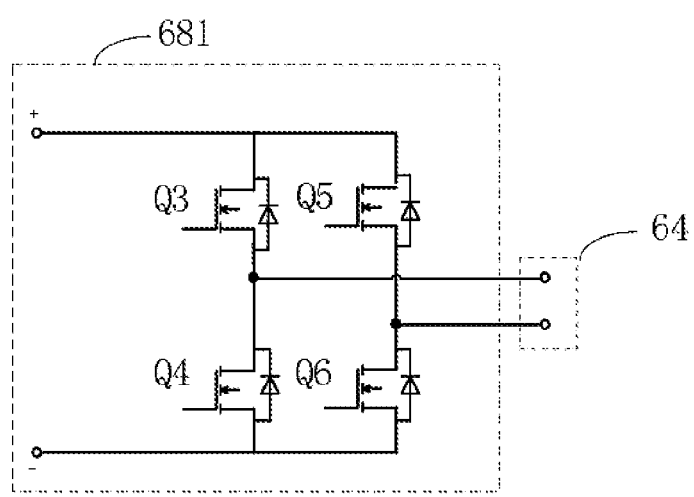
FIG. 10 is a specific circuit diagram of a first voltage conversion unit shown in FIG. 9.

As an example, referring to FIG. 10, the first voltage conversion unit 681 includes a full-bridge inverter circuit, where the full-bridge inverter circuit includes four legs, two non-adjacent legs form a pair, the four legs are divided into two pairs, legs in a pair are simultaneously turned on, and two pairs of legs are turned on alternately. A third switch transistor Q3, a fourth switch transistor Q4, a fifth switch transistor Q5, and a sixth switch transistor Q6 control the four legs to be turned on or off, respectively. Specifically, a drain of the third switch transistor Q3 is connected to a positive electrode of the DC inputted into the positive input terminal of the input interface, and a source of the third switch transistor Q3 is connected to the first power supply terminal of the second output interface; a drain of the fourth switch transistor Q4 is connected to the source of the third switch transistor Q3, and a source of the fourth switch transistor Q4 is connected to a negative electrode of the inputted DC and the negative input terminal of the input interface; a drain of the fifth switch transistor Q5 is connected to the positive electrode of the inputted DC and the positive input terminal of the input interface, and a source of the fifth switch transistor Q5 is connected to the second power supply terminal of the second output interface; and a drain of the sixth switch transistor Q6 is connected to the source of the fifth switch transistor Q5, and the source of the sixth switch transistor Q6 is connected to the negative electrode of the inputted DC and the negative input terminal of the input interface. Gates of the third switch transistor Q3, the fourth switch transistor Q4, the fifth switch transistor Q5, and the sixth switch transistor Q6 are connected to the charging station control module. It is to be understood that the charging power supply module 68 may include another form of inverter circuit such as a half-bridge inverter circuit, which is not limited herein.

When the third switch transistor Q3 and the sixth switch transistor Q6 are simultaneously turned on, a current flows through the third switch transistor Q3, the smart mower connected to the second output interface, and the sixth switch transistor Q6 to form a loop; when the fourth switch transistor Q4 and the fifth switch transistor Q5 are simultaneously turned on, the current flows through the fifth switch transistor Q5, the smart mower connected to the second output interface, and the fourth switch transistor Q4 to form a loop. In this manner, the third switch transistor Q3, the fourth switch transistor Q4, the fifth switch transistor Q5, and the sixth switch transistor Q6 convert the DC into the third AC by changing their respective on/off states. The gates of the third switch transistor Q3, the fourth switch transistor Q4, the fifth switch transistor Q5, and the sixth switch transistor Q6 are connected to the charging station control module 66 separately, and the third switch transistor Q3, the fourth switch transistor Q4, the fifth switch transistor Q5, and the sixth switch transistor Q6 change on or off states at a certain frequency according to a control signal outputted from the charging station control module 66, thereby converting the electrical energy outputted through the second output interface 64 into the third AC.

To charge the battery set 12 in the smart mower 10, the power sub-module 14 further includes an AC-DC conversion circuit to convert the third AC accessed by the charging interface 13 into DC and supply the DC to the battery set 12.

Figure 11:
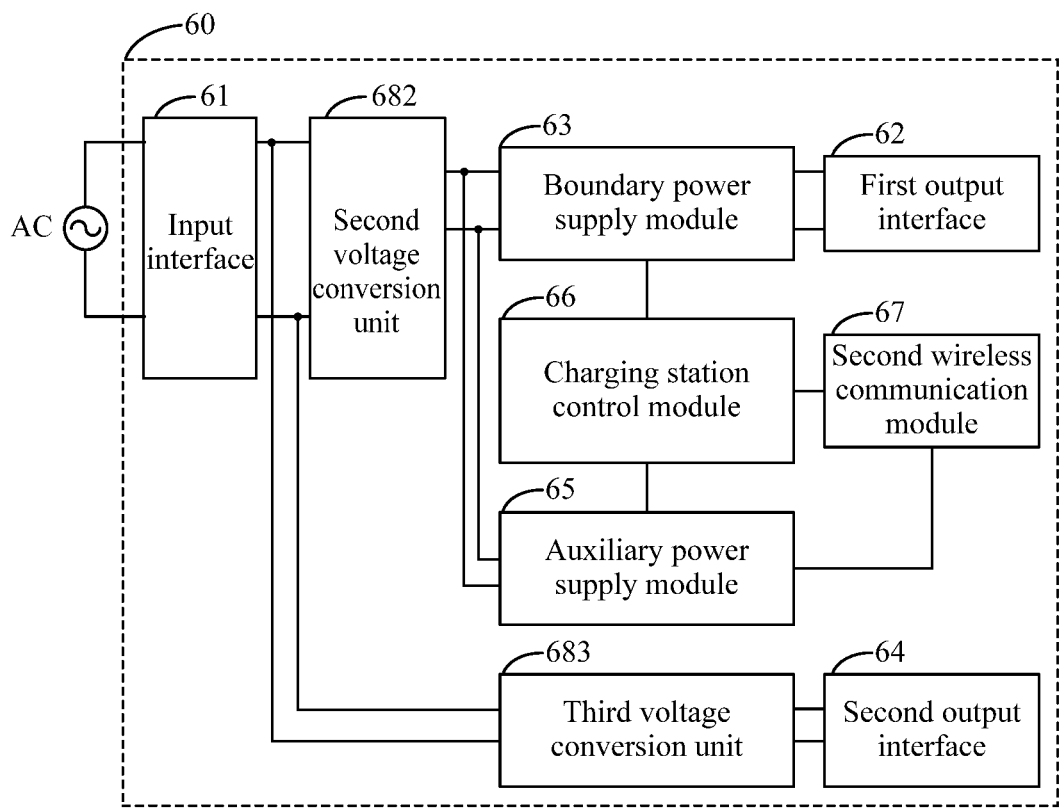
FIG. 11 is a circuit block diagram of a charging station as another example.

FIG. 11 shows a circuit block diagram of the charging station 60 as another example. As shown in FIG. 11, the charging power supply module includes a third voltage conversion unit. The third voltage conversion unit 683 is configured to convert the third AC having the third voltage value and accessed by the input interface 61 into the third AC having the third voltage value.

In this manner, the second output interface outputs the third AC by use of the charging power supply module so that the current flowing through the first power supply terminal and the second power supply terminal of the second output interface changes constantly in magnitude and direction. Therefore, the oxidation speed of the first power supply terminal and the second power supply terminal can be reduced, thereby prolonging the service life of the charging station and improving the safety of the smart mower system.

Figure 12:
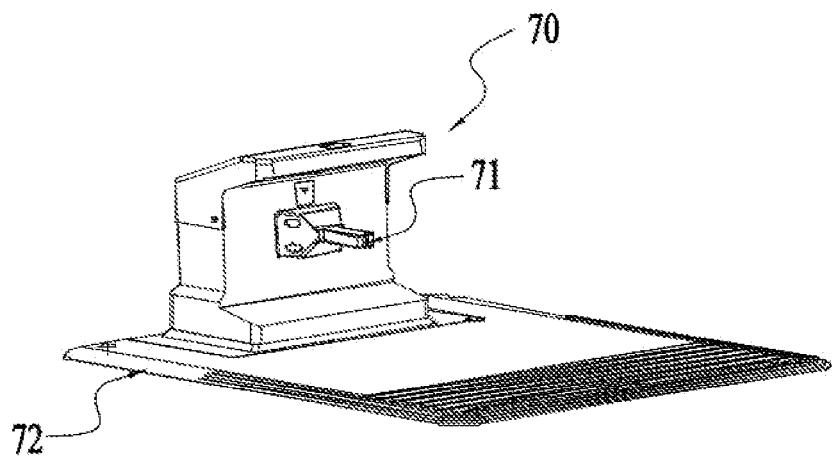
FIG. 12 is a structural view of a charging station as one example.

FIG. 12 shows a structural view of a charging station 70 (20, 40, 50, or 60) as one example. The charging station 70 can also guide the smart mower 10 to interface to provide electrical energy for charging the smart mower 10. As shown in FIG. 12, the charging station 70 includes a second output interface 71 and a base plate 72. The second output interface is used for being connected to the charging interface 13 of the smart mower 10 to output the electrical energy. The second output interface 71 includes a first power supply terminal 711 connected to the first charging terminal 131 of the charging interface 13 and a second power supply terminal 712 connected to the second charging terminal 132 of the charging interface 13.

The base plate 72 is installed in the working area to fix the smart mower 10. In some examples, the base plate 72 substantially has the same size as the smart mower 10 to hold the smart mower 10 in a charging process. An area covered by the base plate 72 defines an area where the smart mower 10 interfaces with the charging station. Therefore, the base plate 72 is used for guiding the smart mower 10 so that the smart mower 10 can identify and approach the position of the charging station.

Figure 13:
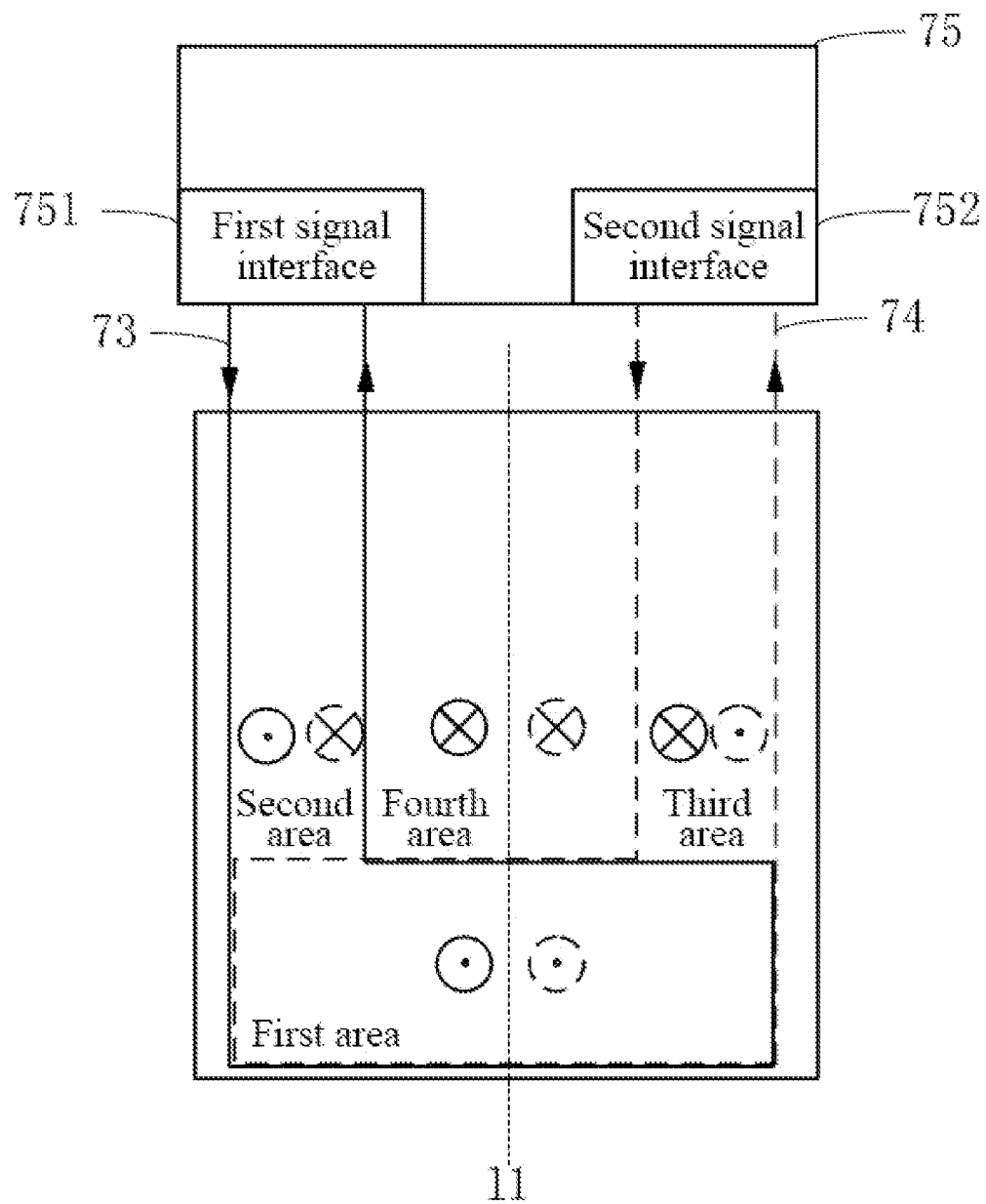
FIG. 13 is a schematic diagram of a base plate of the charging station shown in FIG. 12.

The charging station 70 further includes a first wire 73 and a second wire 74. The first wire 73 and the second wire 74 surround on the base plate 72 separately. As shown in FIG. 13, the first wire 73 and the second wire 74 surround multiple areas. The first wire 73 surrounds a first wire area on the base plate 72, and the second wire 74 surrounds a second wire area on the base plate 72, where the first wire area and the second wire area partially overlap. An overlapping area between the first wire area and the second wire area is defined as a first area, the first wire area includes the first area and a second area, and the second wire area includes the first area and a third area, where the second area is parallel to the third area. In some examples, the first wire area is surrounded in an L shape on the base plate 72, and the second wire area and the first wire area are symmetrical about the center line 11 of the base plate 72, where the first area has a greater width than the second area and has a greater width than the third area. The first wire 73 and the second wire 74 are disposed in this manner mainly to guide the smart mower 10 to a preset position in an interface area in the base plate 72 so that the smart mower 10 interfaces with the charging station 70, that is, the second output interface 71 of the charging station 70 interfaces with the charging interface 13 of the smart mower 10.

The charging station 70 further includes a signal generator 75 connected to the first wire 73 and the second wire 74 separately to output guide signals to the first wire 73 and/or the second wire 74, where the guide signals flow through the first wire 73 and the second wire 74 to generate magnetic fields. The first wire 73 is connected to the signal generator independently of the boundary; and the second wire 74 is connected to the signal generator independently of the first wire 73 and the boundary. Specifically, the signal generator includes a first signal interface 751 and a second signal interface 752, where the first signal interface 751 and the second signal interface 752 are independent of the first output interface 22 (62). The first signal interface 751 is connected to the first wire 73 and used for outputting a first guide signal, where the first guide signal flows through the first wire 73 to generate a first magnetic field; and the second signal interface 752 is connected to the second wire 74 and used for outputting a second guide signal, where the second guide signal flows through the second wire 74 to generate a second magnetic field. It is to be understood that the guide signal is a current signal. In some examples, the first guide signal and the second guide signal are outputted alternately.

In this manner, since magnetic fields inside and outside a wire have different directions, the multiple areas surrounded by the first wire 73 and the second wire 74 have different magnetic field signals. Therefore, the multiple areas surrounded by the first wire 73 and the second wire 74 include at least the first area having a first magnetic field signal, the second area having a second magnetic field signal, and the third area having a third magnetic field signal. Specifically, the first magnetic field signal includes a first magnetic field in a first direction and a second magnetic field in the first direction; the second magnetic field signal includes the first magnetic field in the first direction and a second magnetic field in a second direction; and the third magnetic field signal includes a first magnetic field in the second direction and the second magnetic field in the first direction. In some examples, the multiple areas surrounded by the first wire 73 and the second wire 74 further include a fourth area having a fourth magnetic field signal, where the fourth magnetic field signal includes the first magnetic field in the second direction and the second magnetic field in the second direction. The directions of the magnetic fields inside and outside the wire are related to the direction of a current through the wire. The directions of currents loaded on the first wire 73 and the second wire 74, which are shown in FIG. 13, are used as an example. In this example, the first area has the first magnetic field signal including a first magnetic field in a vertically upward direction and a second magnetic field in the vertically upward direction; the second area has the second magnetic field signal including the first magnetic field in the vertically upward direction and a second magnetic field in a vertically downward direction; the third area has the third magnetic field signal including a first magnetic field in the vertically downward direction and the second magnetic field in the vertically upward direction; and the fourth area has the fourth magnetic field signal including the first magnetic field in the vertically downward direction and the second magnetic field in the vertically downward direction.

Figure 14:
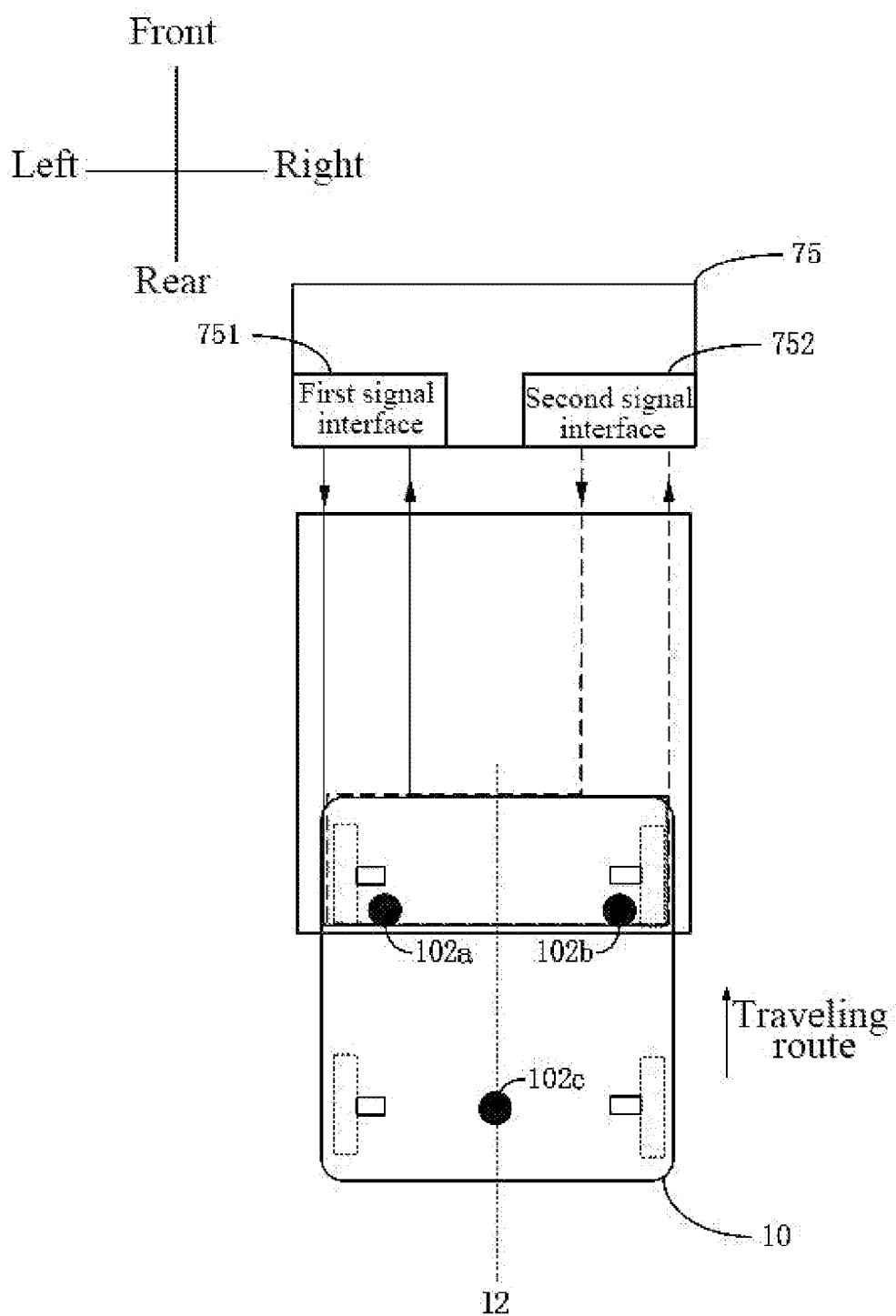
FIG. 14 is a diagram of a relationship between a smart mower and a base plate of a charging station when the charging station guides the smart mower as one example.
Figure 15:
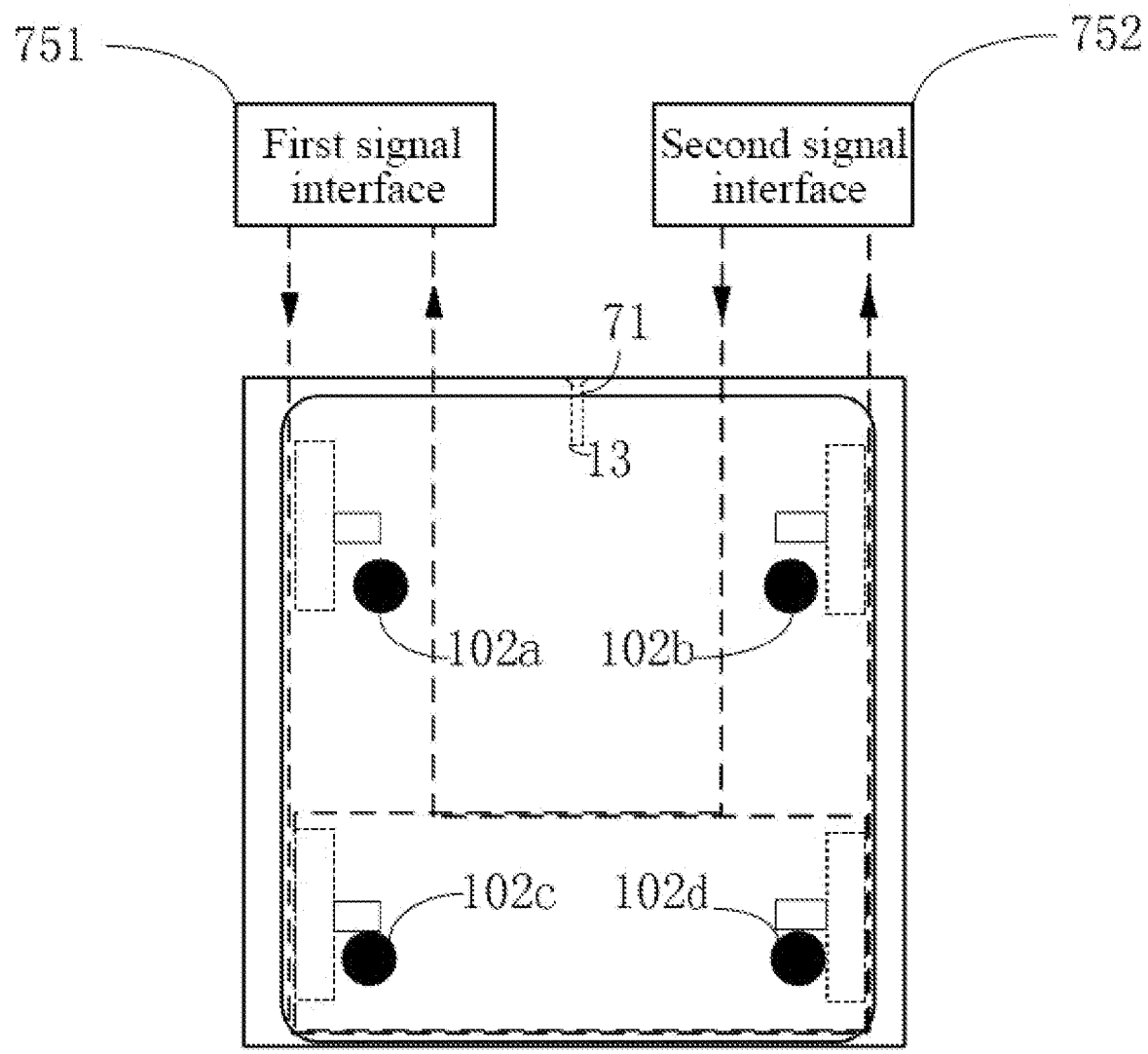
FIG. 15 is a diagram of a relationship between a smart mower and a base plate of a charging station when the charging station guides the smart mower as another example.

The smart mower 10 shown in FIGS. 14 and 15 includes multiple sensors and the mower control module 15, where the multiple sensors are used for sensing magnetic field signals of the multiple areas surrounded by the first wire 73 and the second wire 74. The sensors are magnetic sensors. As an example, the sensors are Hall sensors. For ease of description, the directions shown in FIG. 14 are defined as a front and rear direction and a left and right direction of the charging station, separately.

Specifically, the smart mower 10 includes at least a first sensor 102a and a second sensor 102b. The first sensor 102a is disposed near a left traveling wheel, and the second sensor 102b is disposed near a right traveling wheel. The mower control module 15 is configured to, when the smart mower 10 moves along a route, determine that the smart mower 10 is at a first preset position and control traveling wheels to continue traveling along the route when determining that the first sensor 102a is located in the first area and the second sensor 102b is located in the first area.

In some examples, the smart mower 10 further includes a third sensor 102c disposed near the rear side of the housing 11 of the smart mower. The mower control module 15 is configured to, when the self-driving device moves along a route, determine that the smart mower 10 is at a second preset position and send a stop signal to the traveling motor to stop the smart mower 10 from advancing when determining that the first sensor 102a is located in the second area, the second sensor 102b is located in the third area, and the third sensor 102c is located in the first area.

In some examples, the smart mower 10 further includes the third sensor 102c and a fourth sensor 102d. The third sensor 102c and the fourth sensor 102d are disposed near the rear side of the housing and distributed symmetrically about the center line 12 of the housing of the smart mower 10. The mower control module 15 is configured to, when the first sensor 102a is located in the second area, the second sensor 102b is located in the third area, the third sensor 102c is located in the first area, and the fourth sensor 102d is located in the first area, determine that the smart mower 10 is at the second preset position and send the stop signal to the traveling motor to stop the smart mower 10 from advancing.

The smart mower 10 is provided with multiple sensors so that the mower control module 15 determines the position of the smart mower 10 relative to the base plate 72 more accurately, preventing false determination.

Figure 16:
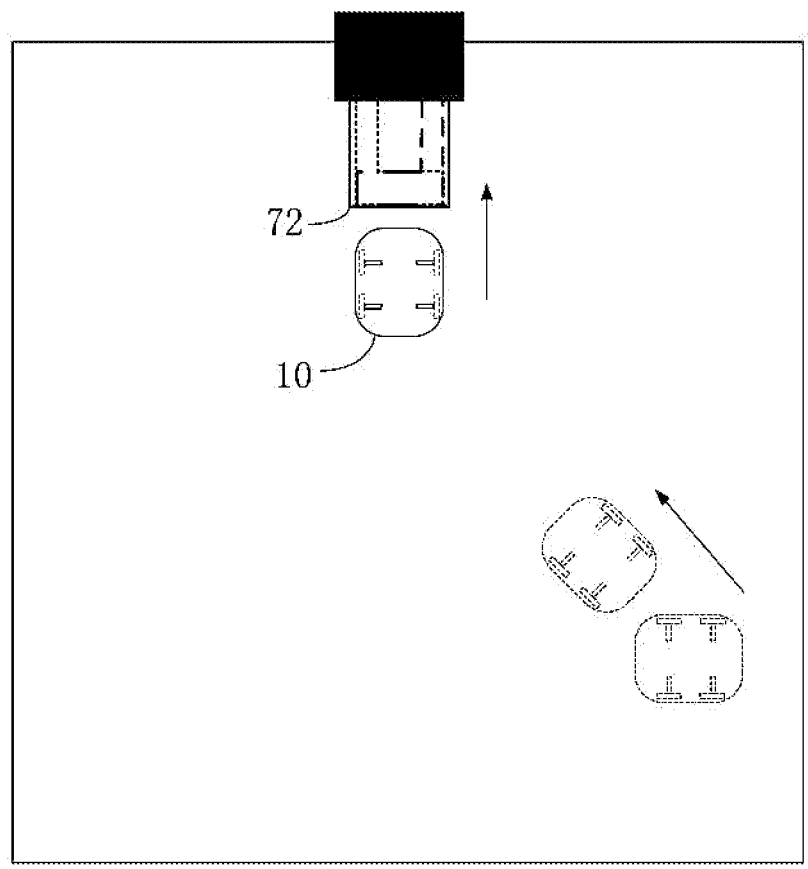
FIG. 16 is a diagram of a route when a charging station guides a smart mower as one example.

The function of the charging station 70 to guide the smart mower 10 to be charged is described with reference to FIG. 16. When the smart mower 10 needs to be charged, the charging station 70 sends the guide signals to the first wire 73 and the second wire 74, the guide signals flow through the wires to generate the magnetic fields, the multiple sensors on the smart mower 10 detect the strength of the magnetic fields, and the mower control module 15 moves the smart mower 10 towards the higher strength of the magnetic fields.

When the smart mower 10 enters the base plate 72 along a route, the mower control module 15 determines whether the smart mower 10 is at a preset position according to the areas where the multiple sensors are located, and if the smart mower 10 is at the first preset position, the mower control module 15 controls the smart mower 10 to continue traveling along the route; otherwise, the mower control module 15 controls the smart mower 10 to adjust the route.

Specifically, the mower control module 15 is configured to receive position signals from the multiple sensors and acquire positions of the multiple sensors, that is, acquire the areas where the multiple sensors are located; and determine whether the smart mower 10 is at the preset position according to the areas where the multiple sensors are located. Further, the mower control module 15 is also configured to determine a position relationship between the smart mower 10 and the base plate 72 according to the areas where the multiple sensors are located and adjust an advancing route of the smart mower 10 based on the position relationship between the smart mower 10 and the base plate 72. The preceding control process of the smart mower 10 is described in detail below with reference to drawings.

Figure 17:
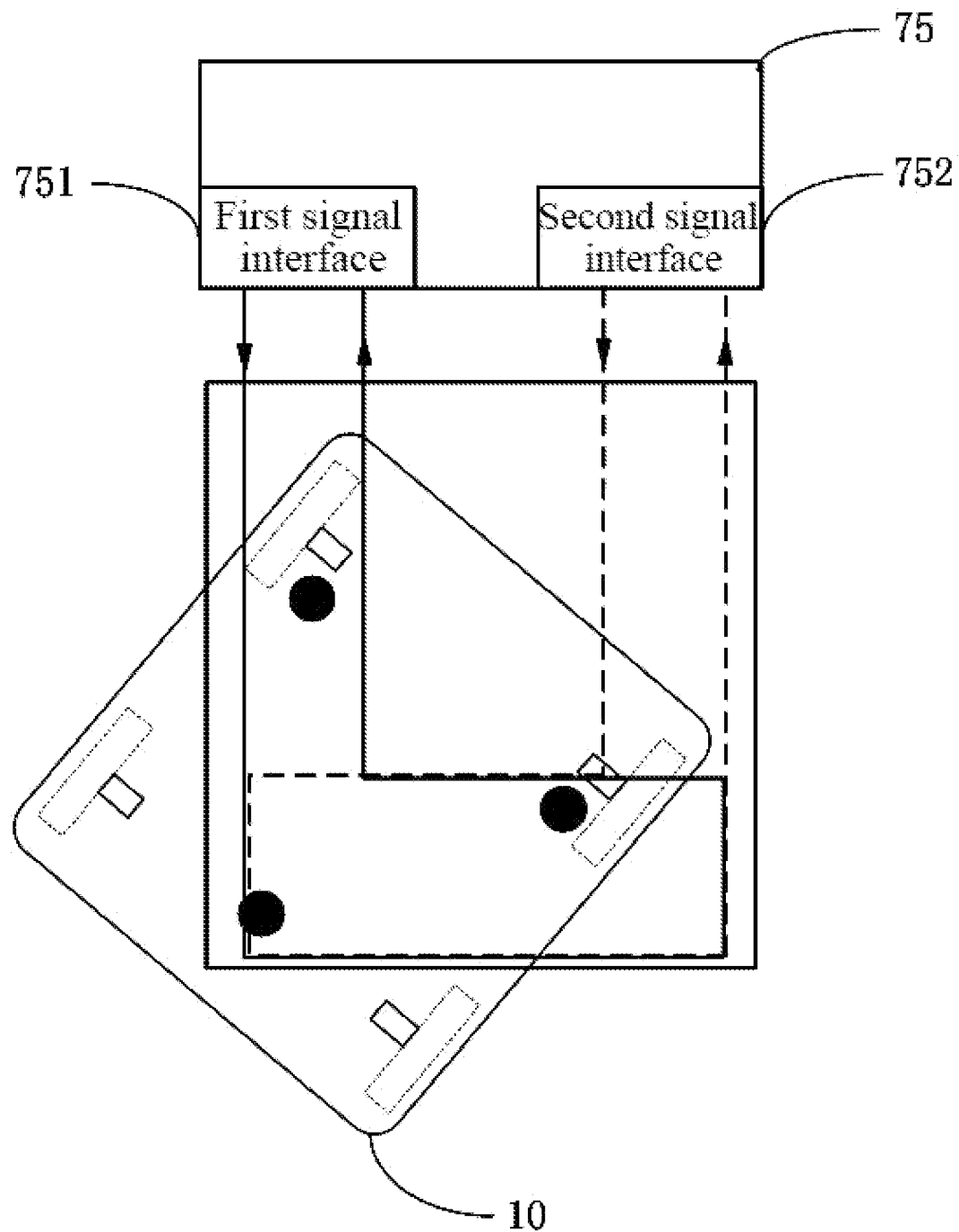
FIG. 17 is a diagram of a relationship between a smart mower and a base plate of a charging station when the charging station guides the smart mower as another example.

FIG. 17 shows one of possible motion routes for the smart mower 10 to enter the base plate 72. In this case, the mower control module 15 identifies that the first sensor 102a is located in the second area, the second sensor 102b is located in the first area, and the third sensor 102c is located in the first area, and then the mower control module 15 determines that the position of the smart mower 10 at this time is not consistent with the first preset position. The mower control module 15 further determines that the smart mower 10 enters the base plate 72 from the left of the base plate 72 based on that the first sensor 102a is located in the second area, the second sensor 102b is located in the first area, and the third sensor 102c is located in the first area, controls the smart mower 10 to move backward to exit the multiple areas surrounded by the first wire 73 and the second wire 74, and controls the smart mower 10 to move a distance towards a right side and drive into the base plate 72. The mower control module 15 continually adjusts the route for the smart mower 10 to enter the base plate 72 until the smart mower 10 reaches the preset position.

In some examples, when the smart mower 10 enters the base plate 72 along a route, the mower control module 15 identifies that the first sensor 102a is located in the first area and the second sensor 102b is located in the second area, determines that the position of the smart mower 10 at this time is consistent with the first preset position, and controls the smart mower 10 to continue traveling along the route; and the mower control module 15 further identifies whether the smart mower 10 is at the second preset position. If the smart mower 10 is at the second preset position, the mower control module 15 controls the smart mower 10 to stop advancing; otherwise, the mower control module 15 controls the smart mower 10 to adjust the route.

Figure 18:
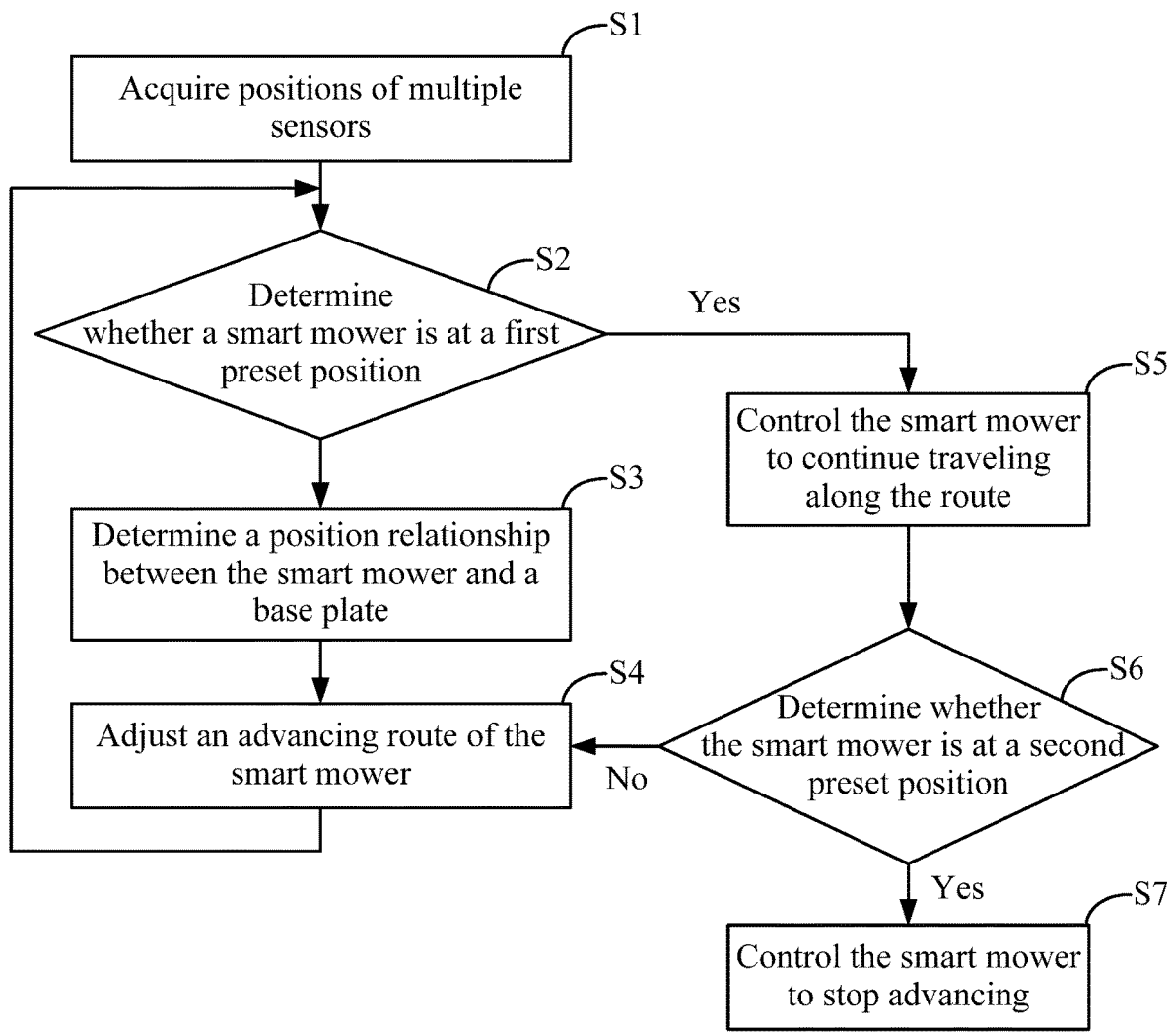
FIG. 18 is a flowchart of a control method for a smart mower as one example.

As shown in FIG. 18, a control method for the preceding smart mower 10 includes the steps below.

In S1, the positions of the multiple sensors are acquired.

In this step, when the smart mower 10 enters the base plate 72 along a route, the mower control module 15 receives the position signals from the multiple sensors and acquires the positions of the multiple sensors, that is, acquires the areas where the multiple sensors are located.

In S2, it is determined whether the smart mower 10 is at the first preset position.

In this step, the mower control module 15 determines whether the smart mower 10 is at the first preset position according to the areas where the multiple sensors are located. If no, S3 is performed. If yes, S5 is performed.

In S3, the position relationship between the smart mower 10 and the base plate 72 is determined.

In this step, the mower control module 15 determines the position relationship between the smart mower 10 and the base plate 72 according to the areas where the multiple sensors are located. For example, in the example shown in FIG. 16, the mower control module 15 further determines that the smart mower 10 enters the base plate 72 from the left of the base plate 72 based on that the first sensor 102*a* is located in the second area, the second sensor 102*b* is located in the first area, and the third sensor 102*c* is located in the first area.

In S4, the advancing route of the smart mower 10 is adjusted.

In this step, the mower control module 15 adjusts the advancing route of the smart mower 10 based on the position relationship between the smart mower 10 and the base plate 72. For example, in the example shown in FIG. 17, the mower control module 15 determines that the smart mower 10 enters the base plate 72 from the left of the base plate 72, controls the smart mower 10 to move backward to exit the multiple areas surrounded by the first wire 73 and the second wire 74, and controls the smart mower 10 to move a distance towards the right side and drive into the base plate 72. The mower control module 15 further continually adjusts the route for the smart mower 10 to enter the base plate 72 until the smart mower 10 reaches the preset position.

In S5, the smart mower 10 is controlled to further travel along the route.

In S6, it is determined whether the smart mower 10 is at the second preset position.

In this step, the mower control module 15 determines whether the smart mower 10 is at the second preset position according to the areas where the multiple sensors are located. If no, S4 is performed. If yes, S7 is performed.

In S7, the smart mower 10 is controlled to stop advancing.

In this manner, the base plate guides the smart mower 10 so that the smart mower 10 can identify and approach the position of the charging station, which can improve the efficiency with which the smart mower returns to the charging station to be charged and the reliability of interfacing for charging.

Figure 19:
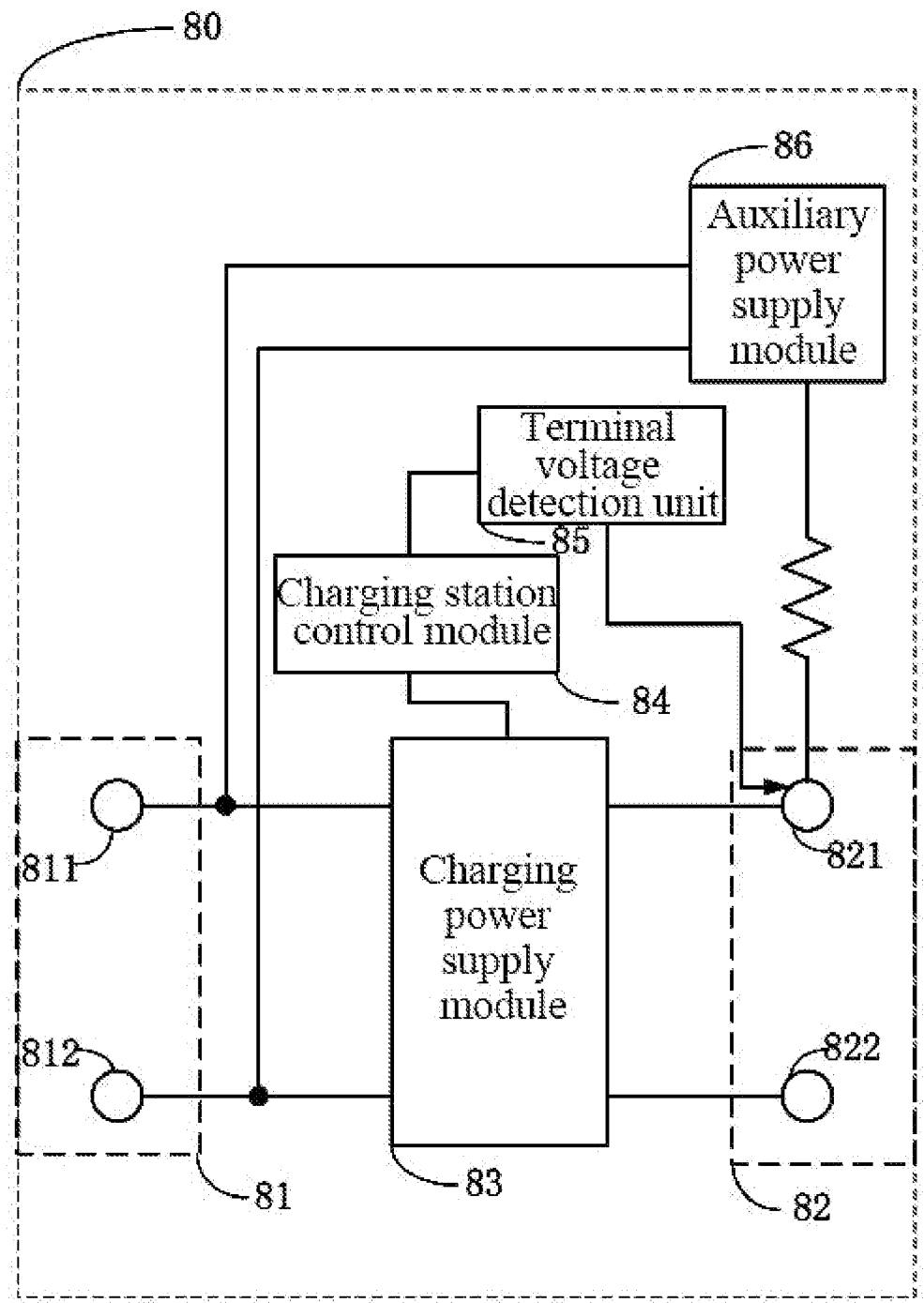
FIG. 19 is a circuit block diagram of a charging station as another example.

FIG. 19 shows a circuit block diagram of a charging station 80 as one example. The charging station 80 further includes a terminal voltage detection unit 85 connected to a charging station control module 84 and configured to detect a voltage value of a first power supply terminal 821. The charging station control module 84 is configured to monitor the voltage value of the first power supply terminal 821 and when the voltage of the first power supply terminal 821 is a preset voltage value and the multiple sensors are at the preset position, determine that the charging interface 13 of the smart mower 10 successfully interfaces with a second output interface 82 of the charging station 80 and make the second output interface 82 output electrical energy to charge the smart mower 10.

An auxiliary power supply module 86 is connected between an input interface 81 and the second output interface 82 and configured to convert supplied electrical energy into other electrical energy and provide the electrical energy for the second output interface 82. Specifically, the auxiliary power supply module converts the electrical energy provided by an external power supply into a voltage value and provides the voltage value for the first power supply terminal 821. For example, the auxiliary power supply module converts a 26 V voltage into a 3.3 V voltage value and loads the 3.3 V voltage value on the first power supply terminal 821.

The terminal voltage detection unit 85 detects the voltage value of the first power supply terminal 821. After the second output interface 82 interfaces with the charging interface 13 of the smart mower 10, the voltage of the first power supply terminal 821 is reduced to a first voltage value, and the terminal voltage detection unit 85 sends a voltage signal including the voltage value of the first power supply terminal 821 to the charging station control module 84. The charging station control module 84 is configured to, when the first voltage value is the preset voltage value and the multiple sensors of the smart mower 10 are at the preset position, send a power supply signal to a charging power supply module 83 to control the connection between the charging interface 13 and the second output interface 82 to be conductive so that the second output interface 82 outputs the electrical energy to charge the smart mower 10.

In this manner, the terminal voltage detection unit detects the voltage value of the first power supply terminal, thereby improving the reliability of interfacing for charging.

Figure 20:
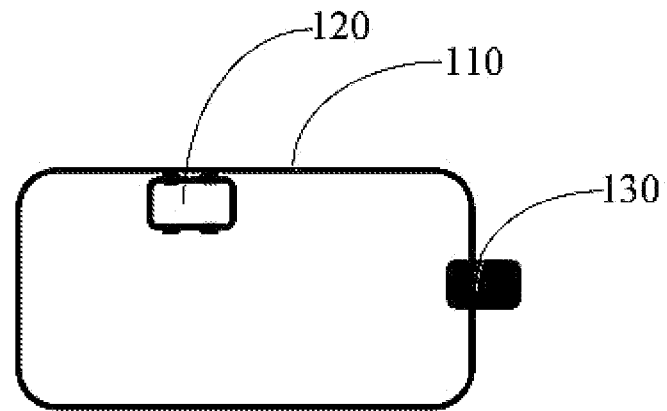
FIG. 20 is a structural diagram of a self-driving device system as one example.

At least two self-driving device systems shown in FIG. 20 can work at the same time. The self-driving device includes a boundary 110 for planning a working area of a self-driving device 120; the self-driving device 120 automatically traveling in the working area to operate; and a charging station 130 electrically connected to the boundary 110 and used for generating a coded boundary signal and sending the coded boundary signal to the boundary 110. The coded boundary signal flows through the boundary 110 to generate a first magnetic field signal. The charging station 130 includes a signal transmitter for generating the coded boundary signal by coding based on a preset coding protocol. The self-driving device 120 receives an external magnetic field signal, acquires a decoded boundary signal in a preset decoding manner, and when the decoded boundary signal matches the coded boundary signal, determines that the external magnetic field signal received by the self-driving device 120 is the first magnetic field signal generated when the coded boundary signal flows through the boundary 110.

The boundary 110 is a closed wire, and two ends of the boundary 110 may be connected to a positive electrode and a negative electrode of the charging station 130 separately. An area surrounded by the boundary 110 is the working area of the self-driving device 120.

In addition, the self-driving device 120 may include at least one tire so that the self-driving device 120 can travel on a lawn. The self-driving device 120 is also provided with a receive sensor, where the receive sensor may receive the first magnetic field signal in a sensing area and convert the first magnetic field signal into a corresponding electrical signal. The receive sensor may include a resonant LC frequency selection circuit, and the LC frequency selection circuit may convert the first magnetic field signal to a voltage signal.

The self-driving device 120 may be a smart mower or a garden power tool such as a snow thrower, which is not limited herein.

Figure 21:
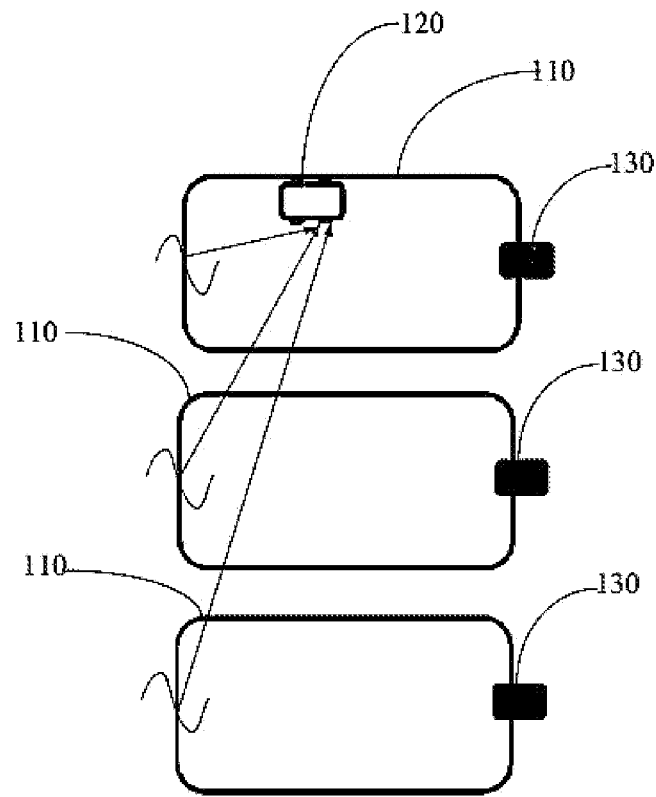
FIG. 21 is a schematic diagram showing that at least three magnetic field signals may be received by a receive sensor of one self-driving device when three self-driving device systems of FIG. 20 are working at the same time.

FIG. 21 shows a schematic diagram showing that at least three magnetic field signals may be received by a receive sensor of one self-driving device when three self-driving device systems are working at the same time. As shown in FIG. 21, three self-driving device systems are included, and then three charging stations 130, three boundaries 110, and three self-driving devices 120 are included, where the three self-driving devices 120 may receive at least three magnetic field signals from the charging stations 130 separately. Since the boundaries of different self-driving devices are adjacent, one self-driving device can receive another external magnetic field signal, causing interference in determining a current position. The receive sensor cannot determine which magnetic field signal is the first magnetic field signal formed by its own self-driving device system and may parse at least three current positions from the at least three magnetic field signals, resulting in the false determination of the current position of the self-driving device. For example, if the self-driving device 120 within the boundary 110 misidentifies a magnetic field signal of an adjacent self-driving device system as its own magnetic field signal, false information that the self-driving device 120 is outside the boundary is obtained. Therefore, the self-driving device 120 must be able to correctly identify which magnetic field signals are from the boundary of its own self-driving device system, avoiding false determination.

The coded boundary signal is transmitted in the boundary and can form an electromagnetic field and generate the first magnetic field signal. The voltage signal into which the first magnetic field signal is converted may be a coded voltage signal so that the voltage signal needs to be decoded and only then the current position of the self-driving device can be determined according to the voltage signal.

Multiple magnetic field signals may be present in the working area of the self-driving device 120, for example, may include a magnetic field signal for an adjacent self-driving device or other external magnetic field signals in a current environment. The self-driving device 120 may acquire all magnetic field signals in the sensing area of the self-driving device 120 and can determine position information of the self-driving device 120 according to only the first magnetic field signal corresponding to the current device.

If the magnetic field signals received by the self-driving device 120 include another external magnetic field signal which may include another coding manner. Therefore, the other external magnetic field signal cannot be decoded or the decoded boundary signal does not match the coded boundary signal, avoiding the case where multiple external magnetic field signals are converted into multiple voltage signals and the current position of the self-driving device is falsely determined.

The decoding manner and the coded boundary signal correspond to each other, the decoded boundary signal and the coded boundary signal match each other, and the coding protocol may be preset.

The self-driving device may include the receive sensor for sensing the first magnetic field signal and converting the first magnetic field signal into the corresponding electrical signal. The receive sensor may include a magnetic field detection sensor which may detect an alternating magnetic field, convert the alternating magnetic field into an electrical signal, and output the electrical signal. In some examples, the receive sensor includes an inductor that senses a magnetic field and generates a corresponding electromotive force to convert the first magnetic field signal into the electrical signal and output the electrical signal.

The signal transmitter may specifically be used for generating the coded boundary signal by coding based on the preset coding protocol.

The signal generator may generate the coded boundary signal by coding in a preset digital coding manner, a quadrature amplitude modulation coding manner, and a relative phase-shift keying manner. Adjacent self-driving device systems may use different coding manners, preventing the current self-driving device from receiving and decoding the first magnetic field signal of an adjacent self-driving device system.

It is to be noted that in practical application, if the self-driving device 120 may receive two magnetic field signals with a relatively large difference in strength, the generation of a code update instruction may be triggered so as to replace the current coding manner and decoding manner.

The self-driving device 120 may decode the first magnetic field signal to obtain the decoded boundary signal and determine the current position of the self-driving device 120 according to the decoded signal.

In this example, the current position of the self-driving device may be obtained by decoding, and specifically, information that the self-driving device is within or outside the boundary may be obtained.

Figure 22:
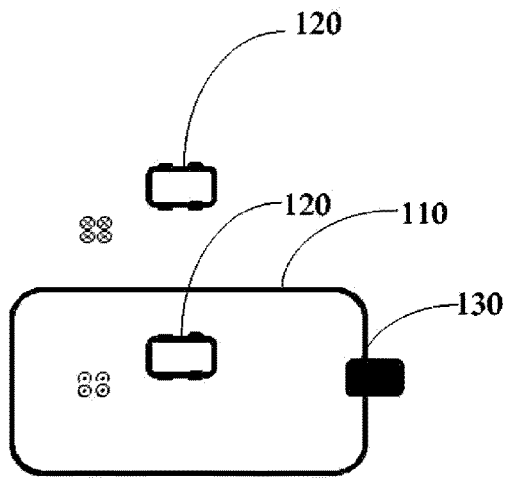
FIG. 22 is a schematic diagram of directions of magnetic fields inside and outside a boundary as one example.

FIG. 22 is a schematic diagram of directions of magnetic fields inside and outside the boundary in this example. As shown in FIG. 22, since the directions of the magnetic fields inside and outside the boundary are completely opposite, the received waveforms have a phase difference of 180°. In this example, the current position of the self-driving device 120 may be obtained through the decoded boundary signal, and specifically, the information that the self-driving device 120 is within or outside the boundary 110 may be obtained.

When the decoded boundary signal is opposite to the coded boundary signal, the self-driving device determines that the self-driving device is outside the working area.

This example discloses the self-driving device system, including the boundary for planning the working area of the self-driving device; the self-driving device automatically traveling in the working area to operate; and the charging station electrically connected to the boundary and used for generating the coded boundary signal and sending the coded boundary signal to the boundary. The coded boundary signal flows through the boundary to generate the first magnetic field signal. The charging station includes the signal transmitter for generating the coded boundary signal by coding based on the preset coding protocol. The self-driving device receives the external magnetic field signal, acquires the decoded boundary signal in the preset decoding manner, and when the decoded boundary signal matches the coded boundary signal, determines that the external magnetic field signal received by the self-driving device is the first magnetic field signal generated when the coded boundary signal flows through the boundary. The preceding technical solution reduces the case where another external magnetic field signal is misidentified as the first magnetic field signal, reducing the false determination of a magnetic field signal and obtaining more accurate position information.

In another example, a self-driving device includes a boundary for planning a working area of a self-driving device; the self-driving device automatically traveling in the working area to operate; and a charging station electrically connected to the boundary and used for generating a coded boundary signal and sending the coded boundary signal to the boundary. The coded boundary signal flows through the boundary to generate a first magnetic field signal. The charging station includes a signal transmitter for generating the coded boundary signal by coding based on a preset coding protocol. The self-driving device receives an external magnetic field signal, acquires a decoded boundary signal in a preset decoding manner, and when the decoded boundary signal matches the coded boundary signal, determines that the external magnetic field signal received by the self-driving device is the first magnetic field signal generated when the coded boundary signal flows through the boundary.

In the preset coding protocol, coded information includes a start code, a charging station code, and an end code, where the start code is used for labeling the beginning of the coded boundary signal; the charging station code is used for identifying the charging station; and the end code is used for labeling the end of the coded boundary signal.

The start code and the end code need to be set for each charging station code to label the beginning and the end of the coding. One charging station may include at least one charging station code which may label the corresponding charging station, and different charging stations may correspond to different charging station codes, that is, different self-driving device systems may correspond to different charging station codes.

The start code and the end code may be coded in the same manner or different manners. Adjacent self-driving device systems may have different start codes and end codes.

Specifically, in the process of coding the boundary signal, the charging station code may be at a central position, and the start code and the end code may be set before and after the charging station code to label the beginning and the end of the coding of the charging station code, respectively.

Figure 23:
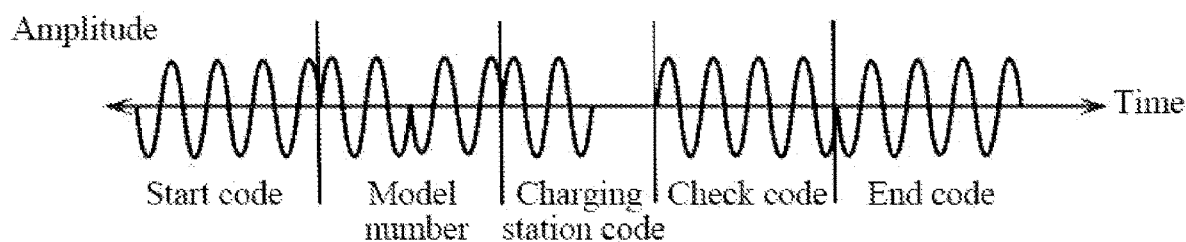
FIG. 23 is a schematic diagram of coding based on a preset coding protocol as another example.

FIG. 23 is a schematic diagram of coding based on the preset coding protocol in this example. As shown in FIG. 23, in this example, the start code and the end code may be consistent, and the charging station code may be between the start code and the end code.

The coded information further includes a model number and a check code, where the model number is used for conveying information about the charging station; and the check code is used for checking whether the coded boundary signal is complete.

The information about the charging station and conveyed by the model number may include a charge current, a charge voltage, a sent one-key regression instruction, and the like.

The check code is used for checking integrity and accuracy of the coded boundary signal.

As shown in FIG. 23, in this example, the model number may be between the start code and the charging station code, and the check code may be between the charging station code and the end code.

In practical application, the model number may be between the check code and the end code or between the charging station code and the check code. The position of the model number is not specifically limited and may be set according to actual situations. The check code may be located after the charging station code to check the integrity and accuracy of the charging station code.

The charging station is electrically connected to the boundary and also used for sending the coded boundary signal to the boundary at different intervals.

Figure 24:
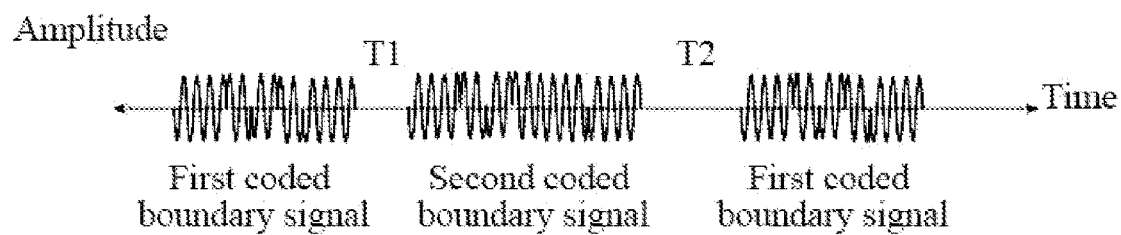
FIG. 24 is a schematic diagram of a sending format of adjacent charging station codes as another example.

FIG. 24 is a schematic diagram of a sending format of adjacent charging station codes according to this example.

As shown in FIG. 24, when a first charging station code and a second charging station code are sent at intervals, T1 between the first charging station code and the second charging station code may be different from T2 between the second charging station code and the first charging station code.

The first charging station code may be a complete boundary signal from the start code to the end code in FIG. 23, and the second charging station code is sent at different intervals so that magnetic field signals from adjacent boundaries can be prevented from overlapping and interfering with each other.

The first charging station code and the second charging station code are the same, but model numbers for the first charging station code and the second charging station code may be the same or different. In this example, T1 and T2 may be set according to actual situations. In practical application, if three charging station codes need to be sent at intervals, time intervals between the three charging station codes may be different. The time intervals between the charging station codes may be different from each other, thereby further increasing the reliability of the coded boundary signal in the presence of an external magnetic field.

The self-driving device includes at least one sensor for sensing a variation of a magnetic field generated when the coded boundary signal flows through the boundary to generate a boundary sensing signal; and a control module configured to receive the boundary sensing signal, acquire the decoded boundary signal based on the preset coding protocol according to at least the boundary sensing signal, and when the decoded boundary signal matches the coded boundary signal, determine that the self-driving device is in the working area.

Specifically, a controller may determine the current position of the self-driving device according to a processed signal, where current position information may include the self-driving device being inside or outside the boundary and distance information between the self-driving device and the boundary.

The sensor may include a receive sensor.

The signal transmitter is also configured to code a boundary signal according to at least one of amplitude coding, frequency coding, and phase coding to obtain the coded boundary signal.

Specifically, when the coding manner includes a digital modulation and coding manner, the boundary signal may be coded according to at least one of the amplitude coding, the frequency coding, and the phase coding so that the coded boundary signal is obtained.

When the coding manner includes another coding manner, the boundary signal may be coded according to other information so that the coded boundary signal is obtained.

Figure 25A:
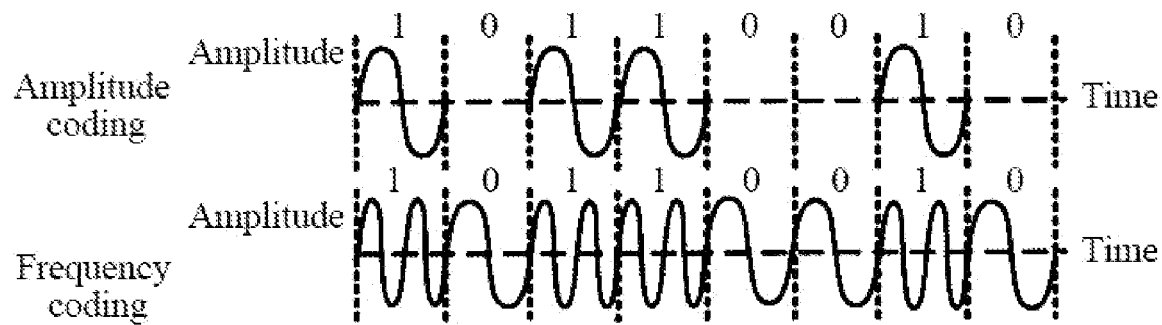
FIG. 25A is a schematic diagram of amplitude coding and frequency coding as another example.
Figure 25B:
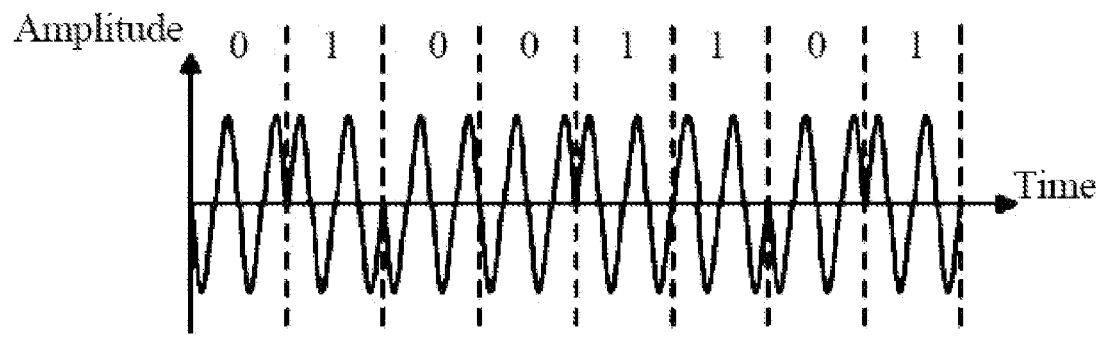
FIG. 25B is a schematic diagram of absolute phase coding as another example.
Figure 25C:
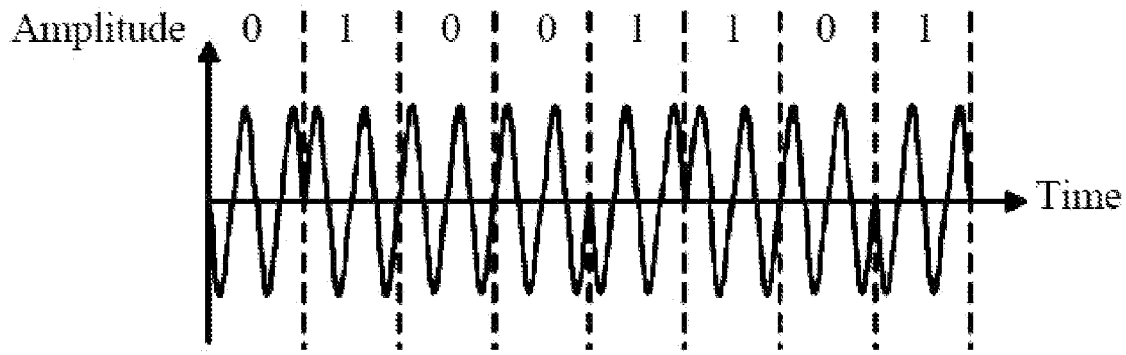
FIG. 25C is a schematic diagram of relative phase coding as another example.

FIG. 25A is a schematic diagram of the amplitude coding and the frequency coding in this example, FIG. 25B is a schematic diagram of absolute phase coding in this example; and FIG. 25C is a schematic diagram of relative phase coding in this example. As shown in FIG. 25A, when digital modulation and coding includes the amplitude coding, the coding manner includes the following.

If the boundary signal has the same frequency and phase, the boundary signal having a first amplitude is coded into a first signal.

If the boundary signal has the same frequency and phase, the boundary signal having a second amplitude is coded into a second signal.

An amplitude-coded signal is obtained according to the first signal and the second signal.

Specifically, the boundary signal having the first amplitude may be coded into "1", the boundary signal having the second amplitude may be coded into "0", and the amplitude-coded signal shown in FIG. 25a may be obtained according to "1" and "0" signals.

In practical application, the boundary signal having the first amplitude may be coded into "0", and the boundary signal having the second amplitude may be coded into "1". The specific coding manner may be determined according to actual requirements.

As shown in FIG. 25A, when the digital modulation and coding includes the frequency coding, the coding manner includes the following.

The boundary signal having a first frequency is coded into a third signal.

The boundary signal having a second frequency is coded into a fourth signal.

A frequency-coded signal is obtained according to the third signal and the fourth signal.

Specifically, the boundary signal having the first frequency may be coded into "1", the boundary signal having the second frequency may be coded into "0", and the frequency-coded signal shown in FIG. 25A may be obtained according to "1" and "0" signals.

In practical application, the boundary signal having the first frequency may be coded into "0", and the boundary signal having the second frequency may be coded into "1". The specific coding manner may be determined according to actual requirements.

As shown in FIG. 25B, when the digital modulation and coding includes the absolute phase coding, the coding manner includes the following.

The boundary signal having a first phase is coded into a fifth signal.

The boundary signal whose phase differs from the first phase by a preset value is coded into a sixth signal.

A first phase-coded signal is obtained according to the fifth signal and the sixth signal.

Specifically, the boundary signal having the first phase may be coded into "0", the boundary signal having a second phase may be coded into "1", and the first phase-coded signal shown in FIG. 25B may be obtained according to "1" and "0" signals.

In practical application, the boundary signal having the first phase may be coded into "1", and the boundary signal having the second phase may be coded into "0". The specific coding manner may be determined according to actual requirements.

As shown in FIG. 25C, when the digital modulation and coding includes the relative phase coding, the coding manner further includes the following.

The boundary signal having a third phase is coded into a seventh signal.

If a phase of an adjacent boundary signal is different from the third phase, the adjacent boundary signal is coded into an eighth signal.

A second phase-coded signal is obtained according to the seventh signal and the eighth signal.

Specifically, the boundary signal having the third phase may be coded into "0", the boundary signal having a fourth phase may be coded into "1", and the second phase-coded signal shown in FIG. 25C may be obtained according to "1" and "0" signals.

In practical application, the boundary signal having the third phase may be coded into "1", and the boundary signal having the fourth phase may be coded into "0". The specific coding manner may be determined according to actual requirements.

The digital modulation and coding further includes pulse-code modulation.

The coding manner includes the following.

The boundary signal is sampled at intervals of a preset time so that sampled signals are obtained.

The sampled signals are layered and integer quantization is performed so that quantized signals are obtained.

The quantized signals are represented by a binary code so that pulse-coded signals are obtained.

Specifically, the boundary signal may be quantized according to the amplitude and a time sequence of the boundary signal, and then the quantized boundary signal is coded in a binary manner so that a pulse-coded signal is obtained.

Figure 26:
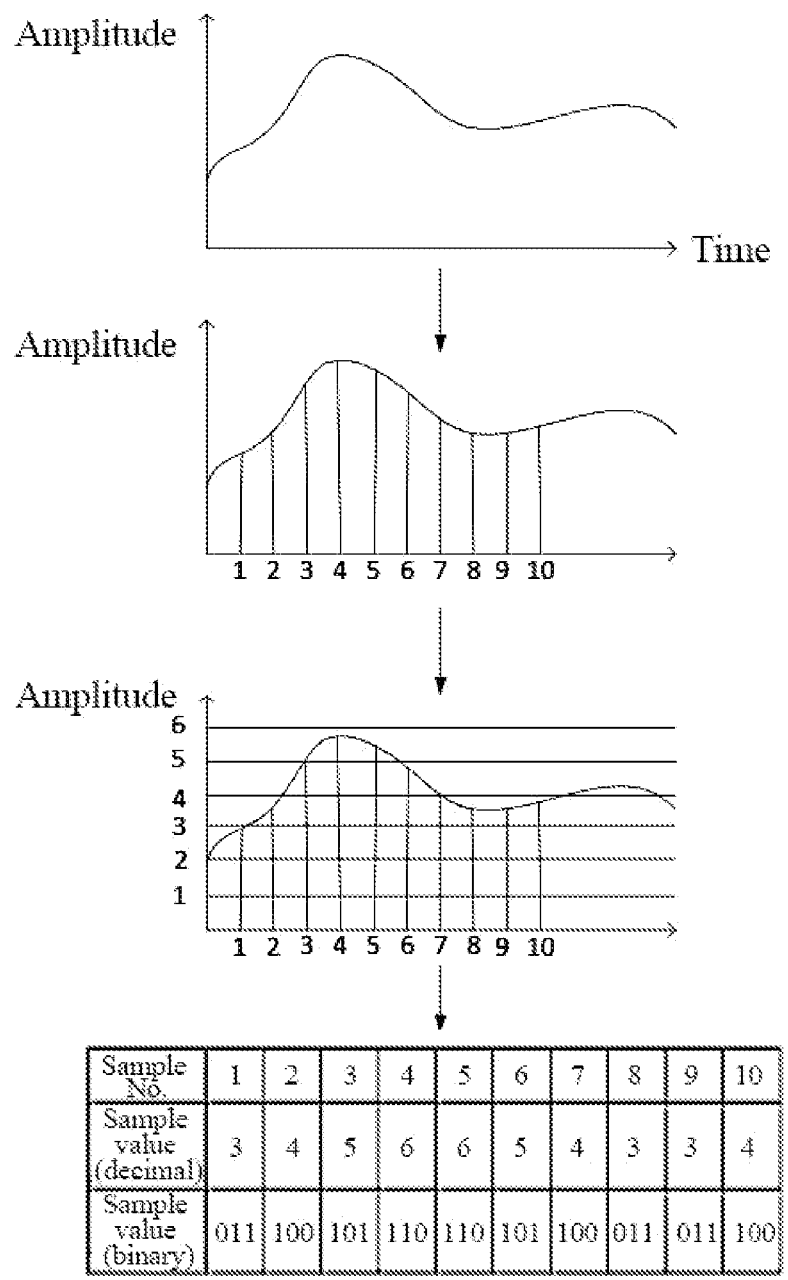
FIG. 26 is a schematic diagram of decoding through pulse-code modulation as another example.

FIG. 26 is a schematic diagram of decoding through pulse-code modulation in this example. As shown in FIG. 26, when the digital modulation and coding includes the pulse-code modulation, the received magnetic field signal is an analog signal, the magnetic field signal may be sampled, quantized, and coded so that the decoded boundary signal is obtained, and when the decoded boundary signal matches the coded boundary signal, it is determined that the self-driving device is in the working area.

If the coding manner includes a preset quadrature amplitude modulation coding manner, the coded boundary signal may be determined according to a varying state of at least one of an amplitude and a phase of the boundary signal.

Specifically, the amplitude of the boundary signal includes a first amplitude and a second amplitude, and the phase of the boundary signal includes a first phase, a second phase, a third phase, and a fourth phase.

When the amplitude of the boundary signal includes the first amplitude, that the coded boundary signal is determined according to the varying state of at least one of the amplitude and the phase of the boundary signal includes the following.

The boundary signal is coded according to the first amplitude and the first phase so that a first coded boundary signal is obtained.

The boundary signal is coded according to the first amplitude and the second phase so that a second coded boundary signal is obtained.

The boundary signal is coded according to the first amplitude and the third phase so that a third coded boundary signal is obtained.

When the amplitude of the boundary signal includes the second amplitude, that the coded boundary signal is determined according to the varying state of at least one of the amplitude and the phase of the boundary signal includes the following.

The boundary signal is coded according to the second amplitude and the first phase so that a fourth coded boundary signal is obtained.

The boundary signal is coded according to the second amplitude and the second phase so that a fifth coded boundary signal is obtained.

The boundary signal is coded according to the second amplitude and the third phase so that a sixth coded boundary signal is obtained.

The signal transmitter is also configured to determine the coded boundary signal according to the varying state of at least one of the amplitude and the phase of the boundary signal.

Specifically, the amplitude of the boundary signal includes the first amplitude and the second amplitude, and the phase of the boundary signal includes the first phase, the second phase, the third phase, and the fourth phase.

FIG. 27 is a schematic diagram of quadrature amplitude modulation coding in this example. As shown in FIG. 27, when the coding manner includes the quadrature amplitude modulation coding manner and the amplitude of the boundary signal includes the first amplitude, the manner for determining the coded boundary signal may include the following.

The boundary signal is coded according to the first amplitude and the first phase so that a first coded boundary signal is obtained.

The boundary signal is coded according to the first amplitude and the second phase so that a second coded boundary signal is obtained.

The boundary signal is coded according to the first amplitude and the third phase so that a third coded boundary signal is obtained.

The boundary signal is coded according to the first amplitude and the fourth phase so that a fourth coded boundary signal is obtained.

When the coding manner includes the quadrature amplitude modulation coding manner and the amplitude of the boundary signal includes the second amplitude, that the coded boundary signal is determined according to the varying state of at least one of the amplitude and the phase of the boundary signal includes the following.

The boundary signal is coded according to the second amplitude and the first phase so that a fifth coded boundary signal is obtained.

The boundary signal is coded according to the second amplitude and the second phase so that a sixth coded boundary signal is obtained.

The boundary signal is coded according to the second amplitude and the third phase so that a seventh coded boundary signal is obtained.

The boundary signal is coded according to the second amplitude and the fourth phase so that an eighth coded boundary signal is obtained.

Specifically, the first amplitude may be $A_1$, the second amplitude may be $A_2$, the first phase may be 0, the second phase may be $\pi/2$, the third phase may be $\pi$, and the fourth phase may be $3\pi/2$.

A code 000 may be obtained according to the first amplitude $A_1$ and the first phase 0; a code 001 may be obtained according to the second amplitude $A_2$ and the first phase 0; a code 010 may be obtained according to the first amplitude $A_1$ and the second phase $\pi/2$; a code 011 may be obtained according to the second amplitude $A_2$ and the second phase $\pi/2$; a code 100 may be obtained according to the first amplitude $A_1$ and the third phase $\pi$; a code 101 may be obtained according to the second amplitude $A_2$ and the third phase $\pi$; a code 110 may be obtained according to the first amplitude $A_1$ and the fourth phase $3\pi/2$; and a code 111 may be obtained according to the second amplitude $A_2$ and the fourth phase $3\pi/2$.

In practical application, the amplitude may also include at least three amplitudes, the phase may also include at least two phases, and the boundary signal is coded. The greater the number of amplitudes and the number of phases, the greater number of codes can be formed. Therefore, more complex coding can be performed so that coding and decoding correspond more accurately, further reducing the false determination of a signal.

The coded boundary signal may be generated by coding in a relative phase-shift keying manner.

That the decoded boundary signal is acquired in the relative phase-shift keying manner according to at least the boundary sensing signal includes the following.

The boundary sensing signal is translated by a first preset period so that a comparative sensing signal is obtained; the boundary sensing signal is multiplied by the comparative sensing signal so that a product sensing signal is obtained; and the decoded boundary signal is generated according to the product sensing signal.

When the coding is performed in the relative phase-shift keying manner, a variation in phase may be used as transmitted information.

Figure 28:
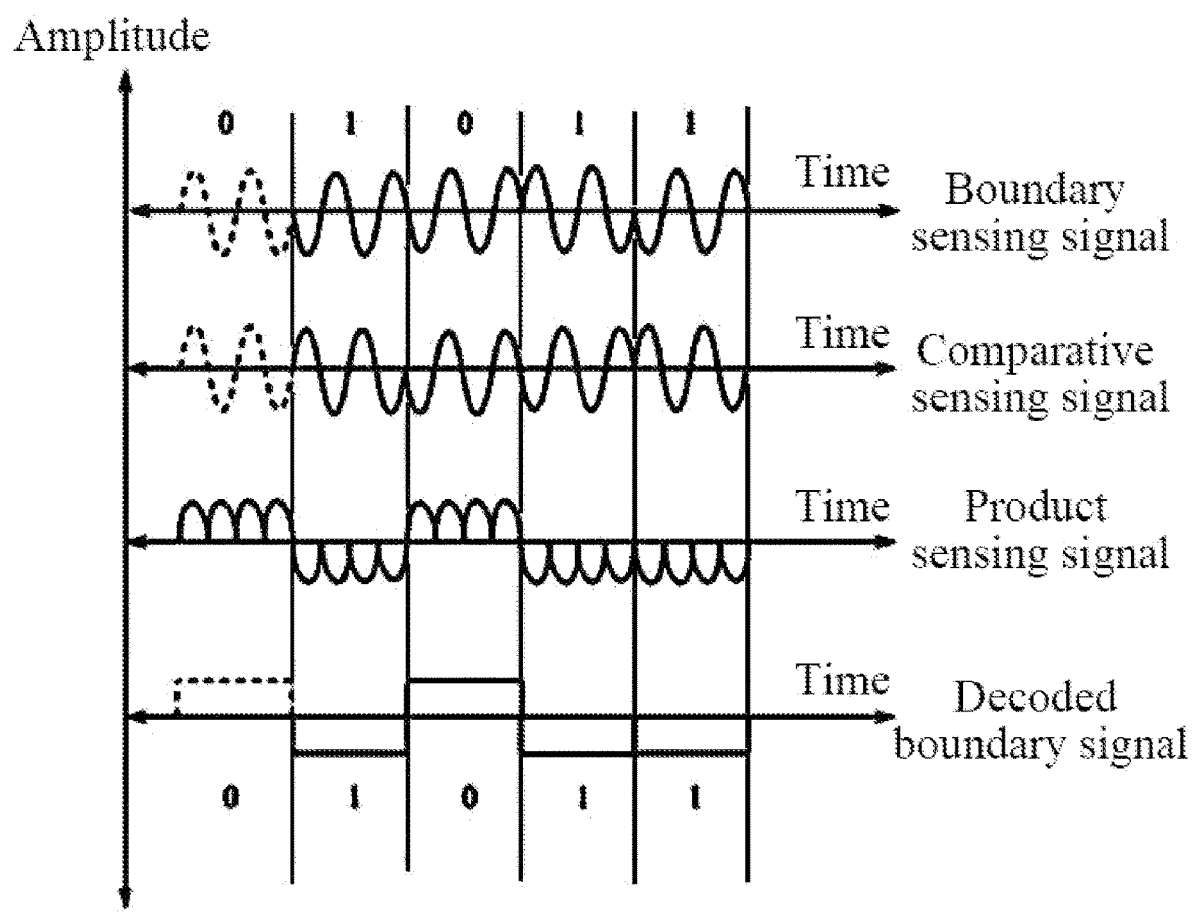
FIG. 28 is a schematic diagram of coding in a relative phase-shift keying manner as another example.

FIG. 28 is a schematic diagram of the coding in the relative phase-shift keying manner in this example. As shown in FIG. 28, the boundary sensing signal is translated by a second preset period so that the comparative sensing signal may be obtained; the boundary sensing signal is multiplied by the comparative sensing signal so that the product sensing signal may be obtained; and "0" and "1" are taken for the product sensing signal according to relative phases of the product sensing signal, respectively so that the decoded boundary signal may be obtained.

In this example, the second preset period may include $2\pi$.

That the decoded boundary signal is generated according to the product sensing signal includes that the decoded boundary signal is generated according to a waveform of the product sensing signal.

Specifically, the waveform of the product sensing signal may be generated from demodulated data, that is, the decoded boundary signal may be generated from the waveform of the product sensing signal.

The first preset period includes $8\pi$.

In practical application, the first preset period and the second preset period may be set according to actual requirements and are not specifically limited herein.

This example discloses the self-driving device system, including the boundary for planning the working area of the self-driving device; the self-driving device automatically traveling in the working area to operate; and the charging station electrically connected to the boundary and used for generating the coded boundary signal and sending the coded boundary signal to the boundary. The coded boundary signal flows through the boundary to generate the first magnetic field signal. The charging station includes the signal transmitter for generating the coded boundary signal by coding based on the preset coding protocol. The self-driving device receives an external magnetic field signal generated when the coded boundary signal flows through the boundary, acquires the decoded boundary signal in the preset decoding manner, and when the decoded boundary signal matches the coded boundary signal, determines that the external magnetic field signal received by the self-driving device is the first magnetic field signal generated when the coded boundary signal flows through the boundary. The preceding technical solution reduces the case where another external magnetic field signal is misidentified as the first magnetic field signal, reducing the false determination of a magnetic field signal and obtaining more accurate position information.

In addition, the start code, the end code, the charging station code, the model number, and the check code can implement the coded boundary signal together so that the coded boundary signal is further made more reliable.

In another example, a charging station for a self-driving device system is provided. The charging station is electrically connected to a boundary and used for generating a coded boundary signal and sending the coded boundary signal to the boundary. The coded boundary signal flows through the boundary to generate a first magnetic field signal.

The charging station includes a signal transmitter for generating the coded boundary signal by coding based on a preset coding protocol.

A self-driving device receives an external magnetic field signal, acquires a decoded boundary signal in a preset decoding manner, and when the decoded boundary signal matches the coded boundary signal, determines that the external magnetic field signal received by the self-driving device is the first magnetic field signal generated when the coded boundary signal flows through the boundary. The charging station is electrically connected to the boundary and also used for sending the coded boundary signal to the boundary at different intervals.

The charging station provided in this example can generate the coded boundary signal and send the coded boundary signal to the boundary, thereby generating an electromagnetic field.

From the preceding description of examples, it is apparent to those skilled in the art that the present application may be implemented by software and necessary general-purpose hardware or may be implemented by hardware. Based on this understanding, the technical solutions of the present application may be embodied in the form of a software product. The software product may be stored in a computer-readable storage medium, such as a computer floppy disk, a read-only memory (ROM), a random-access memory (RAM), a flash memory, a hard disk, or an optical disk, and includes several instructions for causing a computer device (which may be a personal computer, a server, or a network device) to perform the method in each example of the present application.

What is claimed is:

1. A charging station capable of guiding a self-driving device to interface, comprising:
   a base plate at least partially installed in a working area;
   a first wire on the base plate connected to a signal generator independently of a boundary;
   a second wire on the base plate connected to the signal generator independently of the boundary and the first wire; and
   the signal generator sending a guide signal to the first wire and/or the second wire;
   wherein a plurality of areas on the base plate are surrounded by the first wire and the second wire and the plurality of areas comprise at least a first area having a first magnetic field signal, a second area having a second magnetic field signal, and a third area having a third magnetic field signal.

2. The charging station according to claim 1, wherein the plurality of areas surrounded by the first wire and the second wire further comprise a fourth area having a fourth magnetic field signal.

3. The charging station according to claim 2, wherein the fourth magnetic field signal comprises a first magnetic field in a second direction and a second magnetic field in the second direction.

4. The charging station according to claim 1, wherein the first magnetic field signal comprises a first magnetic field in a first direction and a second magnetic field in the first direction, the second magnetic field signal comprises the first magnetic field in the first direction and a second magnetic field in a second direction, and the third magnetic field signal comprises the first magnetic field in the second direction and the second magnetic field in the first direction.

5. The charging station according to claim 1, wherein the signal generator comprises:
   a first signal interface connected to the first wire and used for outputting a first guide signal; and
   a second signal interface connected to the second wire and used for outputting a second guide signal;
   wherein the first guide signal and the second guide signal are outputted alternately.

6. The charging station according to claim 1, wherein the charging station comprises a second output interface for being connected to a charging interface of the self-driving device to charge the self-driving device; and the self-driving device comprises:
   a traveling motor;
   a plurality of sensors for sensing magnetic field signals of the plurality of areas surrounded by the first wire and the second wire; and
   a mower control module configured to control, according to a magnetic field signal sensed by the plurality of sensors, the traveling motor to operate such that the charging interface of the self-driving device interfaces with the second output interface.

7. The charging station according to claim 6, wherein the self-driving device comprises:
   traveling wheels comprising a left traveling wheel and a right traveling wheel;
   a first sensor disposed near the left traveling wheel; and
   a second sensor disposed near the right traveling wheel; and
   the mower control module is configured to:
   when the self-driving device moves along a route, control the traveling wheels to continue traveling along the route when determining that the first sensor is located in the first area and the second sensor is located in the first area.

8. The charging station according to claim 7, wherein the self-driving device comprises:
   a third sensor is disposed near a rear side of the self-driving device; and
   wherein the mower control module is configured to:
   when the self-driving device moves along a route, determine that the self-driving device is at a preset position and send a stop signal to the traveling motor to stop the self-driving device from advancing when determining that the first sensor is located in the second area, the second sensor is located in the third area, and the third sensor is located in the first area.

9. The charging station according to claim 8, wherein the second output interface comprises:
   a first power supply terminal connected to a first charging terminal of the charging interface; and
   a second power supply terminal connected to a second charging terminal of the charging interface;
   a voltage detection unit is configured to detect a voltage value of the first power supply terminal; and
   a controller, when the voltage value of the first power supply terminal is a preset voltage value and the plurality of sensors are at the preset position, making the second output interface output electrical energy to charge the self-driving device.

10. The charging station according to claim 1, wherein the self-driving device is a smart mower.

11. A charging station capable of guiding a self-driving device to interface, comprising:
    a base plate at least partially installed in a working area;
    a first wire surrounding a first wire area on the base plate; and a second wire surrounding a second wire area on the base plate;

wherein the first wire area and the second wire area partially overlap, and the charging station is configured to provide guide signals to the first wire and the second wire to guide the self-driving device to a preset position of the base plate so that the self-driving device interfaces with the charging station.

12. The charging station according to claim 11, wherein an overlapping area between the first wire area and the second wire area is defined as a first area, the first wire area comprises the first area and a second area, and the second wire area comprises the first area and a third area, and the second area is parallel to the third area.

13. The charging station according to claim 12, wherein the first area has a greater width than the second area, and the first area has a greater width than the third area.

14. The charging station according to claim 12, wherein the charging station comprises:
 a first output interface for outputting a boundary signal to a boundary;
 a first signal interface independent of the first output interface, connected to the first wire, and used for outputting a first guide signal; wherein the first guide signal flows through the first wire to generate a first magnetic field; and
 a second signal interface independent of the first output interface, connected to the second wire, and used for outputting a second guide signal; wherein the second guide signal flows through the second wire to generate a second magnetic field;
 wherein the first guide signal and the second guide signal are outputted alternately.

15. The charging station according to claim 11, wherein the first wire area and the second wire area are symmetrical about a center line of the base plate.

16. The charging station according to claim 11, further comprising:
 a second output interface is used for being connected to a charging interface of the self-driving device to charge the self-driving device;
 wherein the self-driving device comprises:
 a traveling motor;
 a plurality of sensors for sensing directions of magnetic fields of a plurality of areas surrounded by the first wire and the second wire; and
 a mower control module configured to control, according to directions of magnetic fields sensed by the plurality of sensors, the traveling motor to operate such that the charging interface of the self-driving device interfaces with the second output interface.

17. The charging station according to claim 16, wherein the self-driving device comprises:
 traveling wheels comprising a left traveling wheel and a right traveling wheel;
 a first sensor disposed near the left traveling wheel; and
 a second sensor disposed near the right traveling wheel; and
 the mower control module is configured to:
 when the self-driving device moves along a route, control the traveling wheels to continue traveling along the route when determining that the first sensor is located in a first area and the second sensor is located in the first area.

18. The charging station according to claim 17, wherein the self-driving device comprises:
 a third sensor is disposed near a rear side of the self-driving device; and
 the mower control module is configured to:
 when the self-driving device moves along a route, determine that the self-driving device is at a preset position and send a stop signal to the traveling motor to stop the self-driving device from advancing when determining that the first sensor is located in a second area, the second sensor is located in a third area, and the third sensor is located in the first area.

19. The charging station according to claim 18, wherein the second output interface comprises:
 a first power supply terminal connected to a first charging terminal of the charging interface; and
 a second power supply terminal connected to a second charging terminal of the charging interface;
 a voltage detection unit is configured to detect a voltage value of the first power supply terminal; and
 a controller, when the voltage value of the first power supply terminal is a preset voltage value and the self-driving device is at the preset position, making the second output interface output electrical energy to charge the self-driving device.

20. The charging station according to claim 11, wherein the self-driving device is a smart mower.

21. A self-driving device system, comprising:
 a self-driving device capable of automatically traveling in a working area to operate; and
 a charging station capable of guiding the self-driving device to interface to charge the self-driving device;
 wherein the charging station comprises:
 a base plate;
 a first wire on the base plate connected to a signal generator independently of a boundary;
 a second wire on the base plate connected to the signal generator independently of the boundary and the first wire; and
 the signal generator sending a signal to the first wire and/or the second wire;
 wherein a plurality of areas on the base plate are surrounded by the first wire and the second wire and the plurality of areas comprise at least a first area having a first magnetic field signal, a second area having a second magnetic field signal, and a third area having a third magnetic field signal.

* * * * *